(12) United States Patent
Dehlsen et al.

(10) Patent No.: US 8,912,677 B2
(45) Date of Patent: Dec. 16, 2014

(54) METHOD AND APPARATUS FOR CONVERTING OCEAN WAVE ENERGY INTO ELECTRICITY

(75) Inventors: James G. P. Dehlsen, Montecito, CA (US); James B. Dehlsen, Montecito, CA (US); Matthew Brown, San Diego, CA (US)

(73) Assignee: Dehlsen Associates, LLC, Santa Barbara, CA (US)

( * ) Notice: Subject to any disclaimer, the term of this patent is extended or adjusted under 35 U.S.C. 154(b) by 12 days.

(21) Appl. No.: 13/135,366

(22) Filed: Jul. 1, 2011

(65) Prior Publication Data

US 2011/0304144 A1 Dec. 15, 2011

(51) Int. Cl.
*F03B 13/18* (2006.01)
*F03B 13/20* (2006.01)
*E02B 9/08* (2006.01)

(52) U.S. Cl.
CPC . *F03B 13/20* (2013.01); *E02B 9/08* (2013.01); *F05B 2240/917* (2013.01); *F05B 2240/93* (2013.01); *F05B 2240/95* (2013.01); *F05B 2240/97* (2013.01); *F05B 2260/02* (2013.01); *F05B 2260/30* (2013.01); *F05B 2260/406* (2013.01); *Y02E 10/38* (2013.01)
USPC .......................................................... 290/53

(58) Field of Classification Search
USPC .......... 60/497, 498, 500, 506; 290/53; 405/76
See application file for complete search history.

(56) References Cited

U.S. PATENT DOCUMENTS

| | | | | |
|---|---|---|---|---|
| 4,158,780 A | * | 6/1979 | Wood | 290/42 |
| 4,258,269 A | * | 3/1981 | Tsubota | 290/53 |
| 4,258,270 A | * | 3/1981 | Tornkvist | 290/53 |
| 4,319,454 A | * | 3/1982 | Lucia | 60/506 |
| 4,480,966 A | * | 11/1984 | Smith | 417/332 |

(Continued)

OTHER PUBLICATIONS

International Search Report of the International Searching Authority published Dec. 23, 2010 (11 pages).

*Primary Examiner* — Tulsidas C Patel
*Assistant Examiner* — Sean Gugger
(74) *Attorney, Agent, or Firm* — San Diego IP Law Group LLP

(57) ABSTRACT

A power-generating device located in or on the surface of the ocean for generating power utilizing the energy in ocean wave motion. The device is moored to the bow and stern at ~45° to incoming ocean waves, and with a yawing capability to adjust to change in wave direction. The device delivers power to a shore grid via a submarine cable from a generator. A rotational driving torque to the generator is produced by two long counter-rotating drive tubes, which are held by bearings in the bow hull and the stern hull of the device. As an alternative, hydraulics may be employed for energy capture and power smoothing and used to provide the rotational torque through a hydraulic motor to drive a generator. The main body is partially submerged and has multiple pod floats connected to the structure by rocker arms with bearings through which the drive tubes pass or double-acting hydraulic rams between the arms and the main body, which capture energy through pod displacement and store it in accumulators. Rotary torque of the drive tubes is produced when the pods move up and down according to motion of the waves and is transmitted to the generator to generate power. In the hydraulic case, energy is stored in accumulators as pressure due to the double-acting hydraulic pistons pumping when the pods move up and down according to the motion of the waves. Hydraulic pressure drives a pump, which provides torque to the generator.

13 Claims, 30 Drawing Sheets

(56) References Cited

U.S. PATENT DOCUMENTS 5,094,595 A * 3/1992 Labrador ...................... 417/332
7,579,704 B2 * 8/2009 Steenstrup et al. ............. 290/53
7,808,120 B2 * 10/2010 Smith ............................ 290/42
8,314,506 B2 * 11/2012 Rhinefrank et al. ........... 290/53

* cited by examiner

Side View

Fig. 42
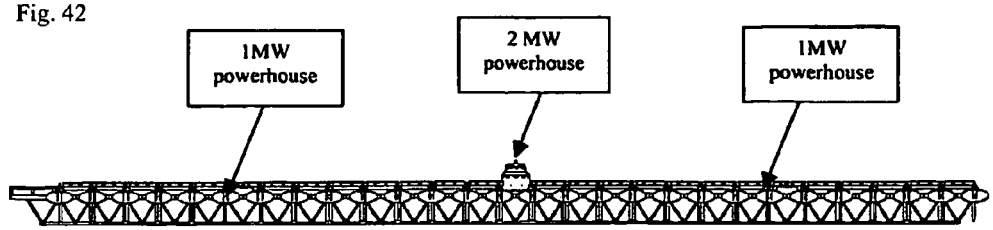
Fig. 43
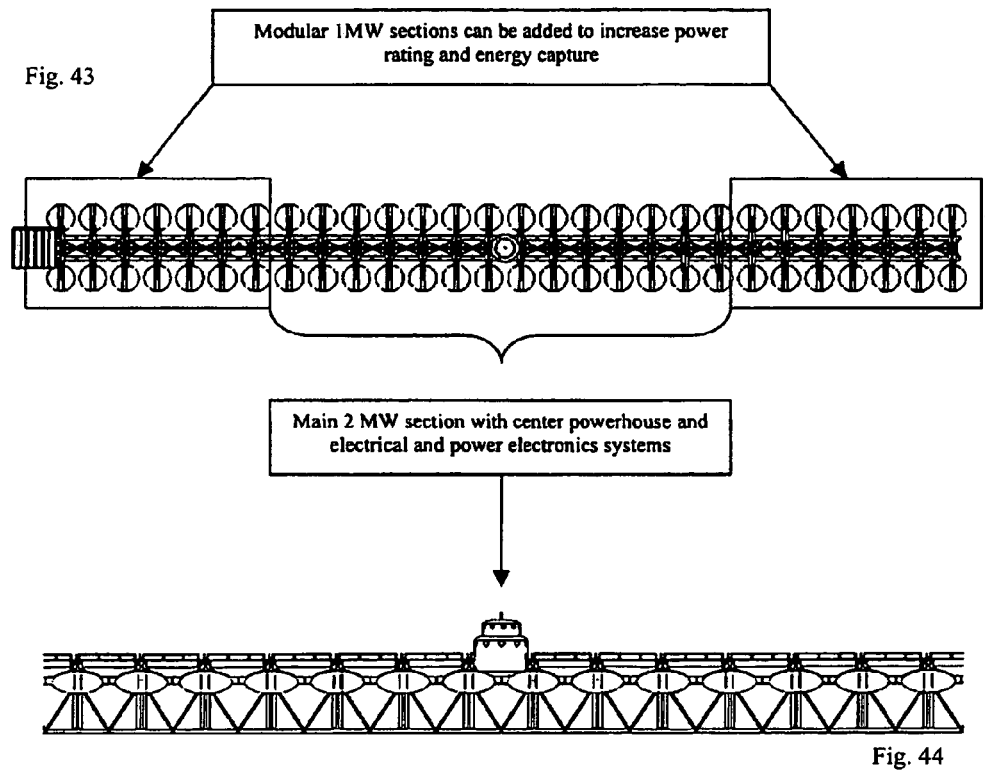
Fig. 44
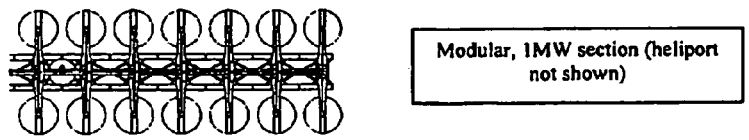
Fig. 45

METHOD AND APPARATUS FOR CONVERTING OCEAN WAVE ENERGY INTO ELECTRICITY

CROSS-REFERENCE TO RELATED APPLICATIONS

The present application is a national stage application of International Patent Application No. PCT/IB2009/006614, filed Aug. 24, 2009, and entitled "Method and Apparatus for Converting Ocean Wave Energy into Electricity," which claims the benefit of U.S. Provisional Patent Application Nos. 61/204,394, filed Jan. 5, 2009; 61/208,792, filed Feb. 27, 2009; 61/208,803, filed Feb. 27, 2009; and 61/208,804, filed Feb. 27, 2009, all of the disclosures of which are hereby incorporated by reference in their entirety for all purposes.

FIELD OF THE INVENTION

The present invention relates to a device, which captures energy resident in the motion of ocean waves to rotate a generator and thereby generate electrical power.

BACKGROUND OF THE INVENTION

The present invention relates to a device, which captures energy resident in the motion of ocean waves to rotate a generator and thereby generate electrical power.

A wave energy converter (WEC) captures energy from ocean surface waves, usually for electricity generation. Of the solar energy forms, the energy of the waves provides the highest energy density. However, prior attempts at wave power generation have not been widely accepted for various reasons.

Wave power is available in low-speed, high forces, and the motion of forces is not in a single direction. Most commercial electric generators operate at higher speeds, and require a steady flow of source energy. Furthermore any apparatus deployed on the ocean must be able to survive severe storms, raising the cost of manufacture and maintenance.

The key to commercial viability of wave technology is a competitive levelized cost of energy (LCOE). Wave power is competitive when the total cost of power generation is low. The total cost includes the capital costs, maintenance costs and electric power delivery costs, and this in relation to the electric power generated, determines the "life-cycle" cost of energy. It is therefore desirable to provide a method and apparatus of obtaining optimum energy extraction from ocean waves at the least cost for the generating system.

The system must have minimal impact on the marine environment, such as fishing grounds and beach shoreline and must not interfere with ocean navigation.

U.S. Pat. No. 4,851,704 to Rubi, titled "Wave action electricity generation system and method" discloses a wave action electricity generation system that includes a floating platform that supports the system components on the water. Wave motion energy is converted into mechanical energy and an electricity generator converts the mechanical power transfer strokes into electrical energy.

The converter includes a cylinder containing a lubricant, in opposed cylinder chamber portions, a first heavily weighted piston that is slidably and freely disposed within the body of the cylinder. The heavily weighted piston is slidably responsive to the wave motion energy of the body of water and is used to compress the fluid to produce respective compression power strokes in each of the cylinder chamber portions. The energy in the compression stroke is received by a second and third pistons located in the cylinder chamber portions that further produce power transfer strokes through the ends of the cylinder. The power transfer strokes associated with the first and second pistons are further converted by a geared transmission to rotary motion that turns a flywheel coupled to an electricity generator. The electrical energy produced is then distributed to a remote power station via a power transmission line.

U.S. Pat. No. 5,889,336 to Tateishi "Power generating installation" discloses a power generating installation located in a shallow water area of the sea for generating power utilizing a shallow water wave. The system comprises a mooring located either in the sea or at the sea bottom, a chain having one end connected with the mooring and the other end to which a dead-weight is attached. A float is provided with a generator and a rotary member for rotating engaged with the chain. Rotary force of the rotary member produced when the float moves up and down according to an up-and-down motion of the wave is transmitted to the generator, thereby to generating power.

U.S. Pat. No. 7,453,165 to Hench "Method and apparatus for converting ocean wave energy into electricity" discloses a method for harnessing power associated with ocean waves and converting that power into electricity. The apparatus is a buoy that houses a vertically oriented central shaft, a pendulum, and a generator. As the buoy tilts from the vertical under the influence of wave motion, the pendulum is accelerated and rotates about the central shaft. A centrally placed generator is mechanically is driven by the rotating pendulum so that the pendulum's kinetic energy is converted into electricity.

The prior art systems are not capable of producing cost-effective, utility-scale power output to meet modern energy needs.

What is needed is a power-generating device for capturing power from ocean wave motion that provides a stable platform and allows the mechanically linked floats (or buoys) to have maximum exposure to wave action and thereby energy capture.

It is further desirable to provide a method of capturing energy from ocean waves that is efficient, cost effective to manufacture and maintain and is capable of withstanding severe weather events.

It is desirable to have a method and apparatus that is scalable to gain economies in deployment and servicing of the wave energy converter.

It is desirable to provide a method and apparatus of placing a wave energy converter in such a configuration that it is capable of being transported to and from port without interference with ocean navigation.

It is also desirable for the wave energy converter to have an active yaw system to enable optimum/maximum exposure to oncoming waves to maximize energy capture.

The invention relates to an apparatus for generating power utilizing ocean waves. According to one aspect of the invention a plurality of force-transmitting floating pods (buoys) engage a rotary shaft. The rotary shaft drives a generator. The rotary shaft produces a rotary force when the pods move up and down according to an up-and-down motion of an ocean wave. The rotary force is transmitted to the generator to thereby cause the generator to generate power.

In accordance with another of the invention, a hydraulic system provides for energy capture in both upward and downward pod motion.

According to the invention floating pods are used which are moving in an up-and-down motion as the waves pass. The pods are coupled or connected to a lever assembly, for example an arm made of a rigid material. The pods are arranged along an elongated base, which may be an open lattice structure allowing waves to pass through it to activate the pods on the opposite side. The length of the base and the number and size of the pods depend on the expected frequency, wavelength, and amplitude of the waves in the target area. The base may be long enough to straddle a multiple of waves, e.g. 2 to 3 long waves thereby minimizing "pitching" of the base, allowing maximum energy capture by the pods. Along the base (e.g. a V-shaped or Box Shape structure), a number of the power generating components are placed. In the case of a mechanical coupling between the arm/lever of the pods and the power generating system the torque transmitting shafts extend along the elongated base. There may be multiple bases rigidly coupled together in order to build a structure extending over several long waves. In the case of a coupling of the arms/levers of the pods to a hydraulic system the base comprises or houses hydraulic cylinders, which are actuated by the force exerted by the moving pods and transmitted by the arms/levers. The base therefore provides a point of application of the leverage force since it does not follow the up-and-down motion of the waves in the same way as the pods. Since the base extends over at least a considerable part of the wavelength of the waves (or even over more than one wavelength) the forces acting on the base are always different from those acting on a single pod (which is extends only over a small fraction of the wavelength). Therefore the pods are moving up and down relative to the base. Since the arms/levers of the pods are coupled to the base so that they are pivotable, they can exert a leverage force on the force transmitting elements.

It is therefore one key feature of the invention to couple a multiple of pods to a common open lattice structure. Since the structure extends over a full wavelength or more than one wavelength, different pods do experience different wave heights or amplitudes. This means the structure as such does not follow the wave motion as the pods do. This gives rise to a relative movement of the pods and the rest of the structure, which in turn is converted into a leverage force and further in rotational torque or into hydraulic pressure.

The structure will actively yaw to be at an angle (~45°) to the oncoming waves in order to optimize exposure to the wavefront and period between waves for minimum pitching and maximum energy capture. As wave direction changes, the system will yaw accordingly.

The base may comprise passive floating elements itself in order to provide for buoyancy. However, the base may also be supported solely by means of the pods coupled to the base.

The pods may be made of any appropriate material, which can stand seawater and mechanical stress. The shape of the pods is optimized for wave lift and travel. The pods may be rotated relative to their attached arms (or levers) to facilitate towing from port to the deployment site, or to minimize wave loading under extreme sea states. The pods may have a chamber that can be flooded to allow the entire wave converter system to submerge below potentially damaging wave orbitals.

Along the base the pods may be arranged on two opposite sides of the base thereby keeping the base in balance and providing for a counterforce against the pods on the other side of the base. The open lattice base to which the pods are attached allows waves to pass through the base structure to freely activate pods on the opposite side.

The design and operational approach according to the invention avoids structural concepts requiring extensive use of structural materials to resist bending, hogging, and torsion loads to sustain extreme wave loads from the 50-year return wave. The invention does this by providing a compliantly moored backbone structure, with the pods riding on the waves. While some of the loads get transferred to the backbone, the power conversion system controls these loads by providing the pods less and less resistance as the wave height increases (resulting in a constant power output). Another method to withstand extreme wave loads is to partially flood the pods and allow the wave converter system to submerge to a depth out of the range of the extreme surface wave forces. As the extreme sea state normalizes, the flooded pods are charged with air pressure to evacuate the seawater, and the system resurfaces.

Due to the length of the structure the pitching in minimized which in turn leads to greater energy capture of the apparatus.

In accordance with yet another aspect of the invention a hydraulic system controls the movement of the pods by using the energy of a wave to activate the hydraulic system and a hydraulic turbine such as an impulse turbine or hydraulic motor connected to an electric generator.

In accordance with a further aspect of the invention the hydraulic system includes an impulse turbine and a impulse turbine nozzle in circuit with a pod hydraulic system, which automatically adjusts the force required to move the pods by the waves with changing wave heights.

In accordance with a further aspect of the invention, the pods and shaft are assembled in lengths that result in a stable center structure enabling maximum usable pod displacement and hence energy capture from ocean waves.

In accordance with a further aspect of the invention, the pods impart pumping force in both the upward and downward wave motion using a double-acting piston pump to pressurize hydraulics allow for energy capture.

The invention has the advantage that the modular units allow for cost-effective manufacturing and deployment and tailoring of total power per device, given the needs and resources at the site.

The invention has the advantage that the units assembled to lengths that result in a stable center structure enabling maximum usable pod displacement and hence energy captured from the waves.

The invention has the advantage that the system uses soft-stop hydraulics for piston throw.

The invention has the advantage that a cable-stayed structure version of the design in the center, or base structure, results in cost and weight savings.

The invention has the advantage that the pod hydrodynamic and hydrostatic shape is optimized for low cost of energy (maximizing lifting and dropping forces while minimizing undesired loads, lift force from wave orbitals) and may be rotated at the attachment to the arm to minimize drag during towing to the deployment site, to minimize exposure to waves during extreme wave events.

The invention has the advantage that the tubular base structures double as a hydraulic accumulator to level output. The tubular structure may also serve as ballast, and or pressurized air tanks to clear flooded pods of seawater to resurface the submerged system once extreme wave conditions subside.

The invention has the advantage that the pod variable lift and drop forces maximize energy capture.

The invention has the advantage that system enables multi-directional and frequency energy capture.

The invention has the advantage that the yaw system provides for an individual unit and collective units in an array to manage changes in direction of wind and/or wave travel to maximize energy capture.

The invention has the advantage that mooring systems employed share mooring points, reducing costs

BRIEF DESCRIPTION OF THE DRAWINGS

FIG. 42 is side view of the apparatus of FIG. 40 showing the location of the main 2 MW powerhouse and the location of two 1 MW powerhouses;
FIG. 43 is a top view of the apparatus wherein modular 1 MW sections have been added to increase power rating and energy capture and the landing platform for service vessels;
FIG. 44 is a side view of the main 2 MW section with a center powerhouse and electrical and power electronic systems;
and
FIG. 45 is a top view of one modular, 1 MW section.

DETAILED DESCRIPTION OF THE PREFERRED EMBODIMENTS

Figure 1:
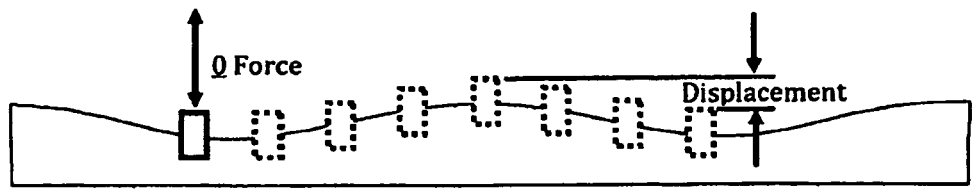
FIG. 1 is a zero force example of the prior art.

Refer to FIG. 1, which is a zero force example of the prior art. In this example a single buoy that is not fixed, such that there is no force applied to the buoy, so no energy is absorbed from the wave. The wave amplitude remains the same.

Figure 2:
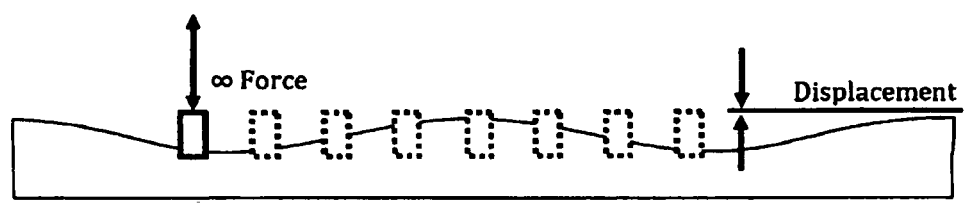
FIG. 2 is a stationary volume example of the prior art.

Refer to FIG. 2, which is a stationary volume example of the prior art. In this example, a single buoy is fixed as waves pass by it. Since there is no displacement there is no energy absorbed. The amplitude of the wave remains the same before and after passing the buoy. While passing the buoy, it is apparent that the forward face of the wave gains height as the buoy is submerged since the volume of the buoy is added to the volume of the wave. The aft face of the wave loses height as the buoy surfaces.

Figure 3:
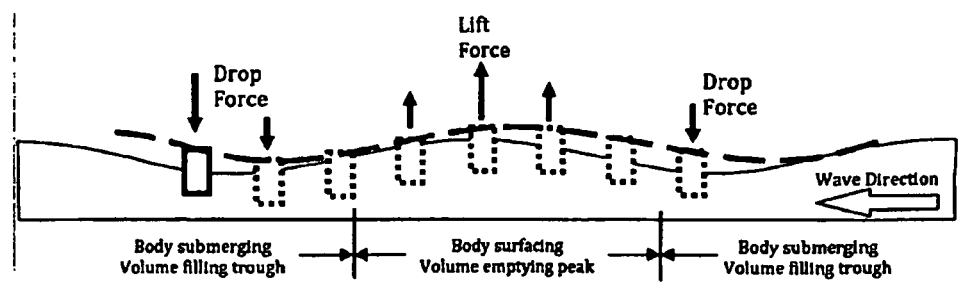
FIG. 3 is an example of a theory behind the embodiments of the wave energy converter of the present invention.

Refer to FIG. 3, which is an example of a wave energy converter (WEC) of the present invention. In this example, a volume (such as a buoy) has something attached to it to restrict its motion and has a force imparted to it. This force displaces over some distance so energy is absorbed from the wave and the wave amplitude is decreased. The amplitude is decreased because the buoy oscillates in a sinusoidal pattern that is out of phase with the wave. The buoy submerges in the trough, filling it, and surfaces in the peak, reducing its height.

Figure 4:
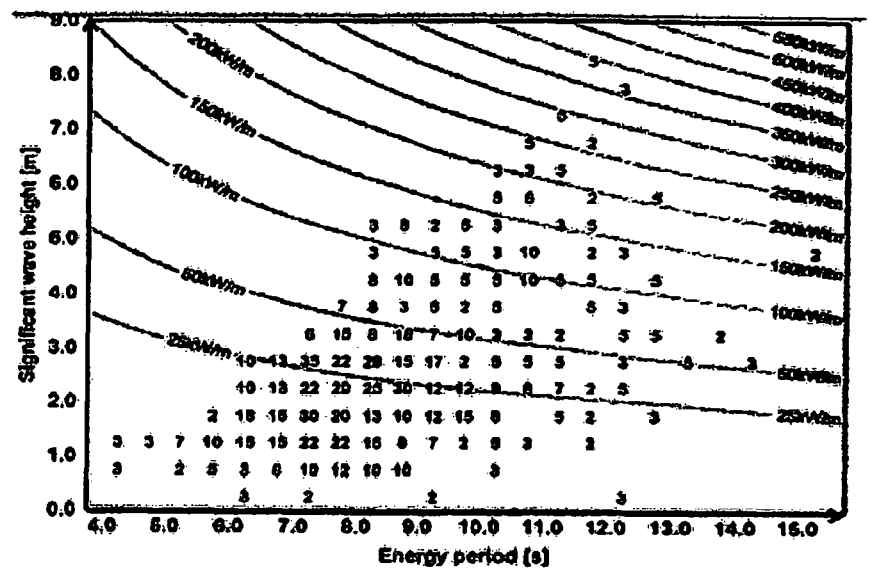
FIG. 4 is chart of wave spectrum versus power.

Refer to FIG. 4, which is chart of wave spectrum versus power and illustrates that the energy of a wave is limited. A 3.5 m wave with a period of 9.5 seconds only has the potential power of 55 kW per meter of transverse wave face. At 50% efficiency, it would take 90 meters across the wave to generate 2.5 MW of power. For this reason, the wavefront exposure of the wave energy converter needs to be of a design, which takes the forgoing into consideration.

Figure 5:
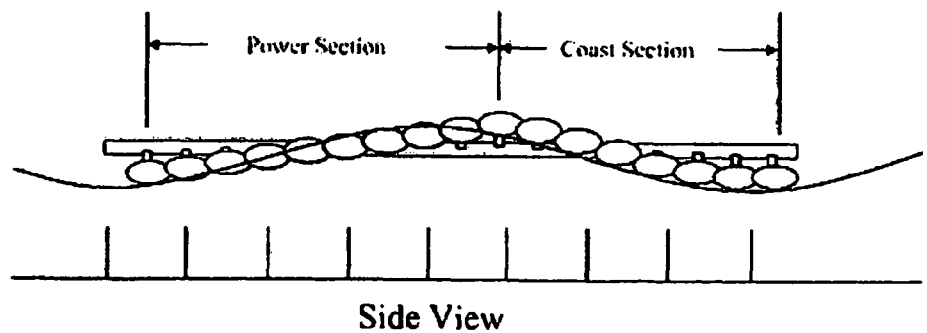
FIG. 5 is an illustration of pod motion from the side view a wave energy converter of the first embodiment of the present invention on the surface of the ocean in response to ocean waves.

Refer to FIG. 5, which is a side view of a wave energy converter of the present invention on the surface of the ocean. The device can be tuned via pod arm stiffness, orientation and length to increase power and has a correction of up to −50% added to the efficiency due to anticipated pitching of the entire wave energy converter unit, which should increase its power output. All of the pods in the "power section" are linked to the torque shaft and rotate about the shaft axis at the same speed. This causes the pods to lift at nearly a constant speed. The shaft rotation speed determines how quickly the pods submerge and their maximum displacement. The speed is chosen for maximum power. The pods do not have a constant displaced volume, which reduces energy capture. The pods in the "coast section" are not linked to the torque shaft and therefore do not contribute to the power generation in this situation.

Figure 6:
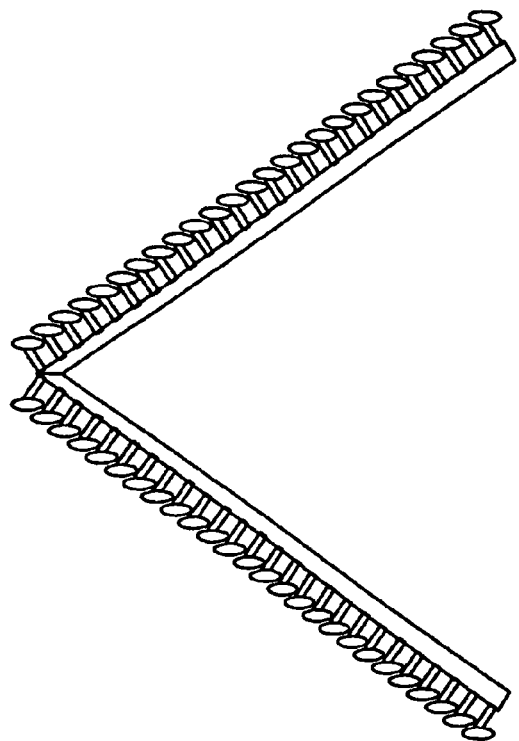
FIG. 6 is a top view of one example of a first embodiment of the wave energy converter of FIG. 5.

Refer to FIG. 6, which is a top view of the wave energy converter of FIG. 5. For a 2.5 MW device there is a total of 50 pods, 25 for each side, V-shaped. It is assumed that the ocean wave is 3.5 m in height, with a 9.5 s period and 140 m wave length. This results in 2.8 RPM with 4250 kN-m torque on the device shafts. The aft width of the V-shaped device is 190 m.

First Embodiment of the Invention

Figure 7:
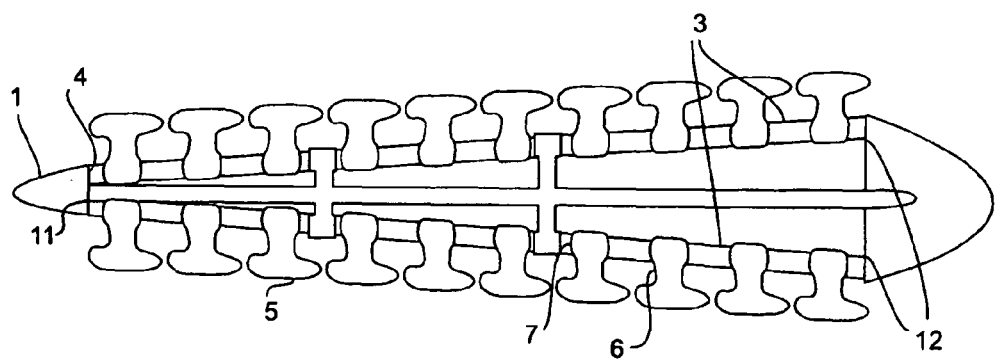
FIG. 7 is a top view of a first embodiment of a wave energy converter of the present invention.
Figure 8:
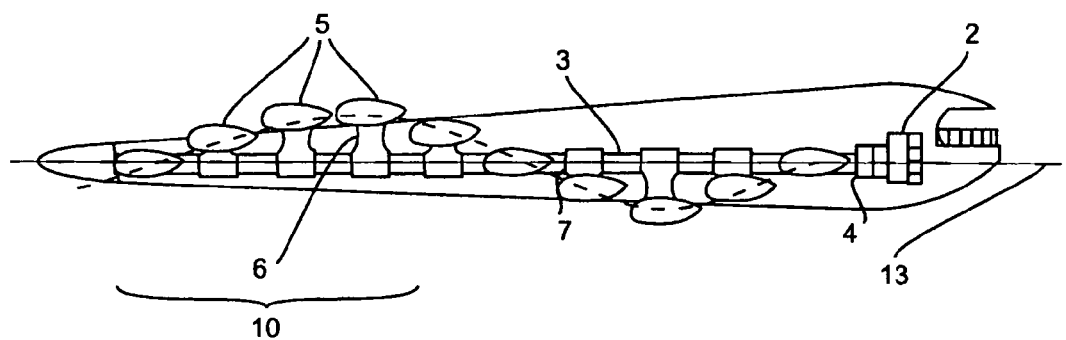
FIG. 8 is a side view of the first embodiment of the wave energy converter of the present invention.

Refer to FIG. 7, which is a top view and FIG. 8, which is a side view of a first embodiment of a wave energy converter of the present invention. The wave energy converter (WEC) is an electric power-generating device, which is driven by ocean wave action. The device is moored from the bow 1 facing the incoming wave usually windward and delivers power to the shore grid via submarine cable from the generating power train 2. In this setup there is a mechanical coupling between the pods and the shafts 3. However, the pods are coupled to the shafts via a device that allows a transmission of a rotary motion from the lever assemblies/arms to the shaft in only one direction, while preventing transmission of a rotary motion in the opposite direction.

Figure 9:
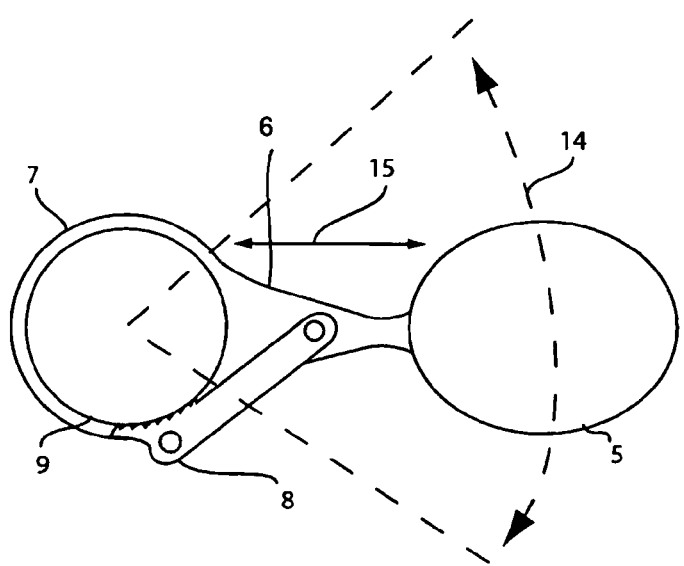
FIG. 9 is an end view of the drive tube, ratchet and float pod of the wave energy converter of FIG. 7.
Figure 10:
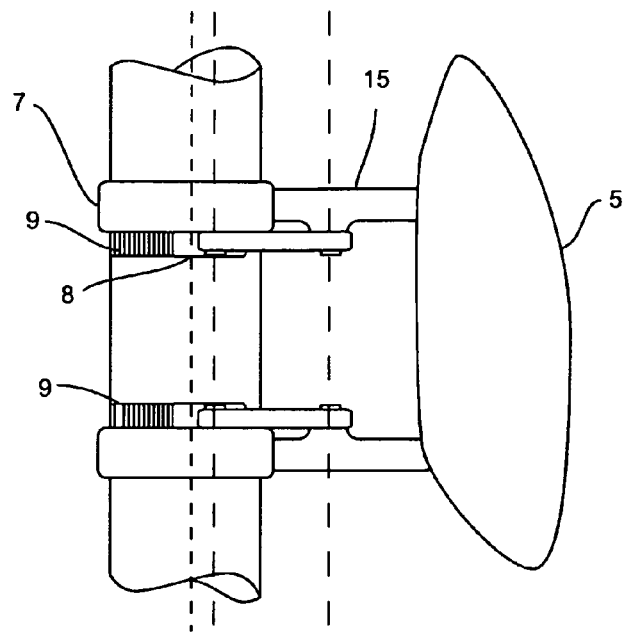
FIG. 10 is a top view of the drive tube, ratchet and float pod of the wave energy converter of FIG. 7.

In this connection refer to FIG. 9, which is an end view, and FIG. 10, which is a top view, of the drive tube, ratchet and float pod of the wave energy converter of FIG. 7. Two long counter-rotating drive tubes (shafts) 3 produce the rotational driving force to the generators. The drive tubes 3 are held by bearings 4 in the bow hull and the stern hull. The tubes have multiple pod floats 5 connected to the tubes by rocker arms 6 with bearings 7 through which the drive tubes pass.

The rocker arms have a ratcheting mechanism 8, which engages with the drive tube as the float pods rise with a wave, thereby applying a turning moment to the drive tube. The drive tube is fitted with the ratchet receiver 9, which engages with the rocker arm ratchet mechanism. As the wave recedes, the ratchet disengages and the float pod falls to the trough of the wave to again re-engage as the next wave approaches.

As shown in FIG. 8, multiple float pods along the length of the drive tube enable passing waves to serially lift the group 10 of float pods thereby applying a continuous turning motion to the drive tube 3. Wave intervals may vary and still produce a constant force. More power is generated with higher frequency shorter interval waves and less power with longer frequency waves.

At the bow hull 1, (FIG. 7) the drive tubes are in close proximity to each other and at the point of entering the aft hull, have increased separation 12. This provides each down stream float pod along the drive tubes to gain added exposure to waves, which would otherwise have diminished wave energy levels if float pods were aligned directly down stream.

In calm waters, the drive tubes with float pods float to approximately the drive tube centerline 13 while the pods float with only the top surface exposed above the water line.

The motion of the pods is in a radial arc 14 of about 90 degrees from the centerline axis of the drive tubes with a rise and fall above and below the drive tube centerline of 45 degrees each. This range of motion allows for energy capture from waves up to maximum operating wave height for normal operation. The length 15 of the rocker arms/lever assemblies determines this range of motion of the pods, thus, the system can be "tuned" to wave conditions in the deployment area by optimizing the length of the rocker arms. The pods have a hydrodynamic shape (see FIG. 10) designed to provide "lift" as the wave moves past with minimum disturbance of the waveform and to minimize the loss of energy in the wave.

Second Embodiment of the Invention

Figure 11:
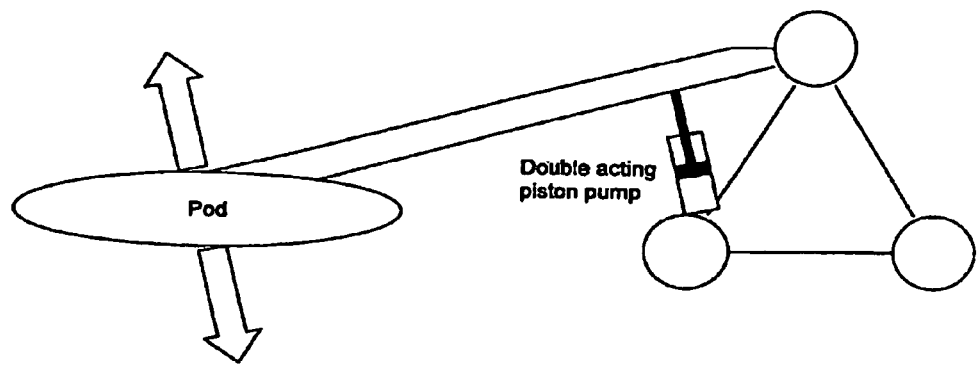
FIG. 11 is a diagram of double acting piston pumps employed in the second embodiment of the wave energy converter of the present invention.
Figure 12:
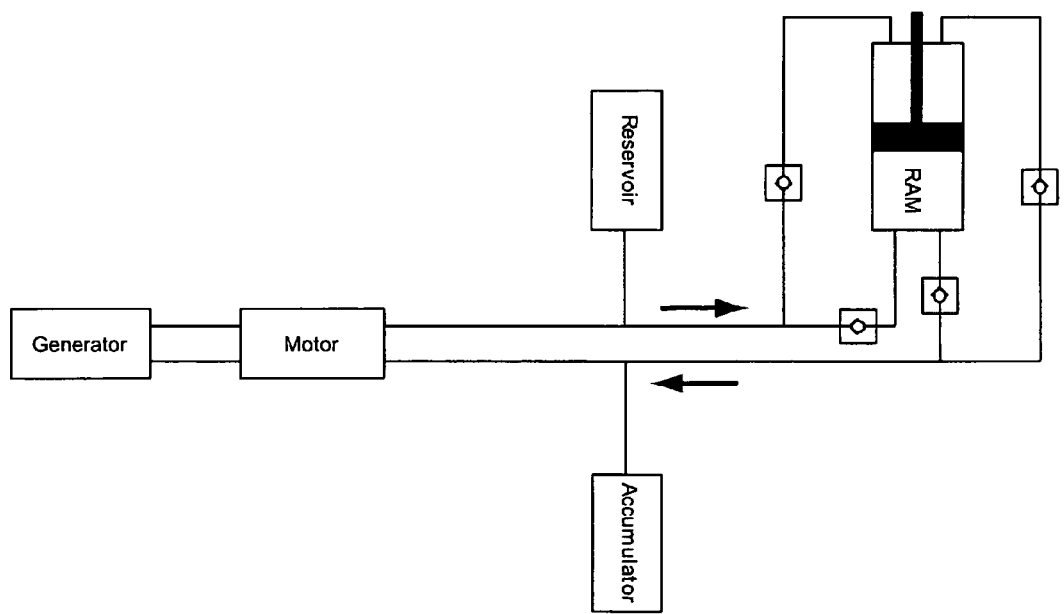
FIG. 12 is a diagram of double acting piston pumps in combination with a hydraulic motor.

According the second embodiment, the pods are not coupled mechanically to any rotating shaft. Instead, a double-acting piston is actuated by the up-and-down moving pod. For that purpose the lever assembly is hinged to the base structure and the piston is coupled to the lever arm between the pod and the hinge. As shown in FIGS. 11 and 12 the piston pumps high-pressure hydraulic fluid from a reservoir to an accumulator. The accumulator is a pressure storage reservoir in which the hydraulic fluid is held under pressure by an external source (e.g. a spring or a compressed gas). The accumulator feeds a hydraulic motor and smoothes out the oscillations in wave energy. The hydraulic motor drives a generator.

Figure 12A:
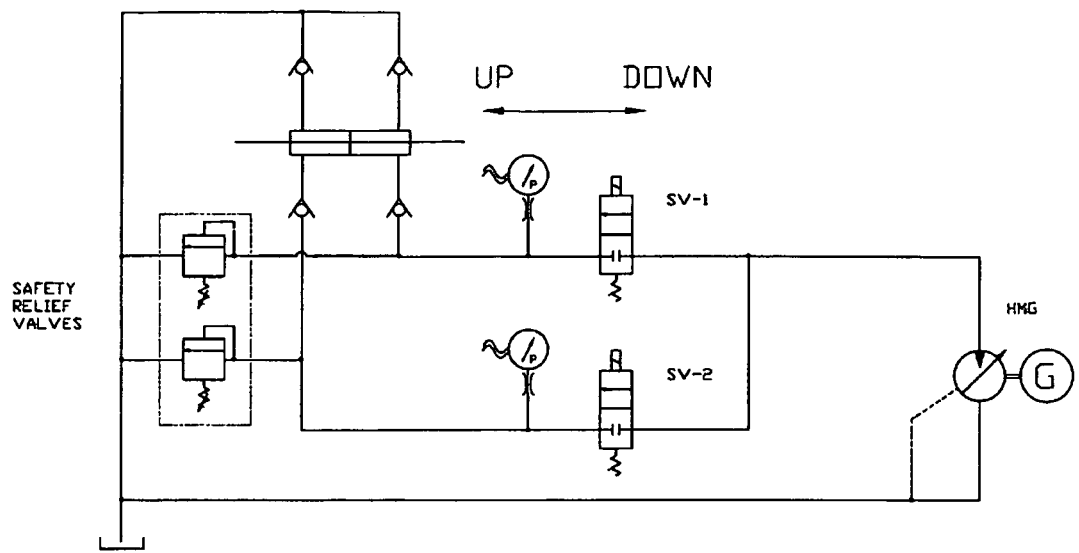
FIG. 12a is a more detailed diagram of a hydraulic system as used with the invention.

FIG. 12a shows a more detailed view of the hydraulic system. The hydraulic system is an actively controlled, oil-based or seawater system consisting of a series of oscillating pumps (hydraulic rams connected to each pod) supplying variable-displacement hydraulic motors, direct-driving generators at a constant speed. As the approaching wave exerts its buoyant force on the pod (pump piston moves to left) SV-2 remains closed until a prescribed pressure (generator load pressure) is reached. At this point SV-2 opens and the pressurized oil is supplied to the hydraulic motor. As the wave passes and the buoyant force on the pod diminishes, SV-1 holds the pod suspended until the pressure reaches the load pressure at which point SV-1 opens and the pressurized fluid is ported to the hydraulic motor. Multiple, out-of-phase pods will help ensure constant flow.

Figure 12B:
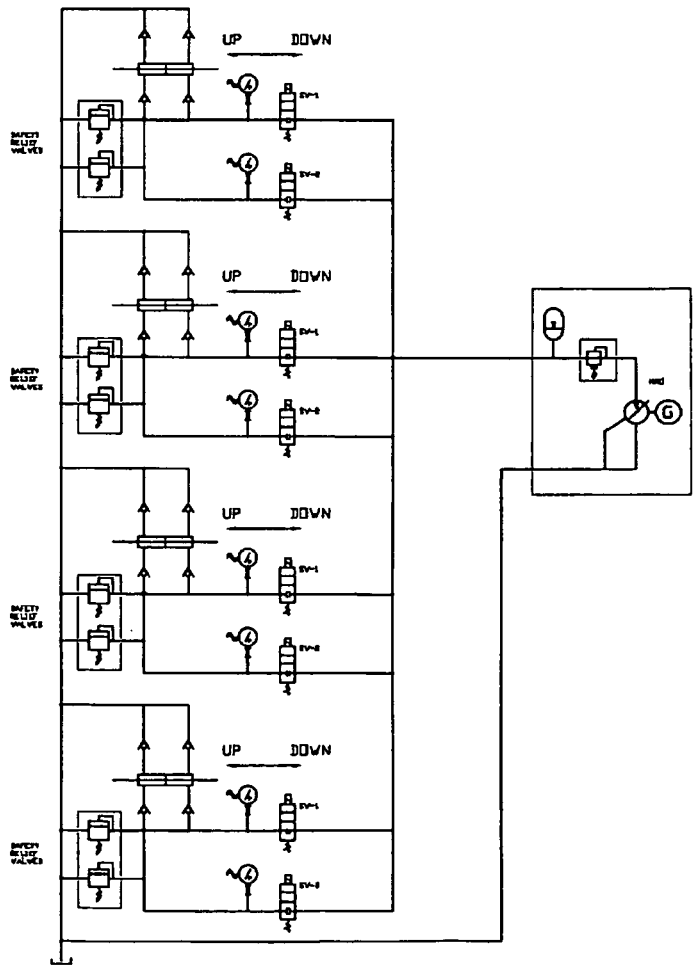
FIG. 12b is a more detailed diagram of an alternative hydraulic system as used with the invention.

The pods will be ganged together in groups of four to eight supplying a single generator. The displacement of the hydraulic motor will be varied based on the average wave height and period (available flow), allowing the generators to run at constant speed and pressure but variable input torque (output current)—i.e. as the wave height decreases the generator current output will decrease proportionately. FIG. 12b, shows a typical four-pod HMG set.

Figure 13:
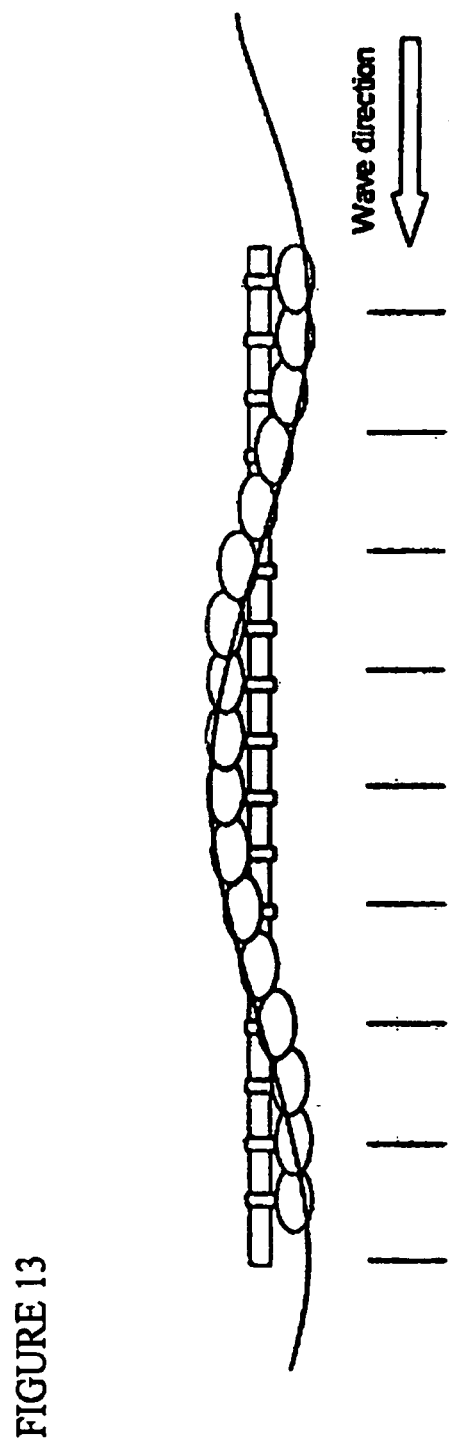
FIG. 13 is an illustration of pod motion from the side view of the second embodiment of the present invention on the surface of the ocean in response to ocean waves.

Refer to FIG. 13, which is an illustration of pod motion in response to ocean waves. These pods are half the density of seawater. The pod on the far left starts on the surface of a trough. It submerges and adds volume to the trough. When it is almost completely submerged, its buoyancy force overcomes the hydraulic pressure in the piston and it rises to the crest of the wave. There it surfaces from the crest, removing volume, until its weight overcomes the ram force and it drops to the trough.

Compared to the torque shaft first embodiment of the invention, this design has a constant force over its displacement and acts in both the rise and fall of the pod due to the hydraulic coupling. It also has canceling moments applied to the device so there is no net rolling moment. The wave energy converter (WEC) according to this embodiment extracts power from waves on both the up and downswing of the waves. The up and down motion of the waves cause multiple pods to move up and down. The up and motion of the pods actuate hydraulic pistons that pump hydraulic fluid. Again, due to the fact that the energy converter length extends over one or more waves the pods experience different amplitudes of the wave at the same time. There is always a group of pods, which is moved upwards by the waves and a group of pods that moves downward. Even if the pods may always spend a short time span at the turnaround positions during which they do not pump the fluid to a considerable extend, some other hydraulic pistons are pressurized at the same time since the associated pods are in a different stage of the motion.

Figure 14:
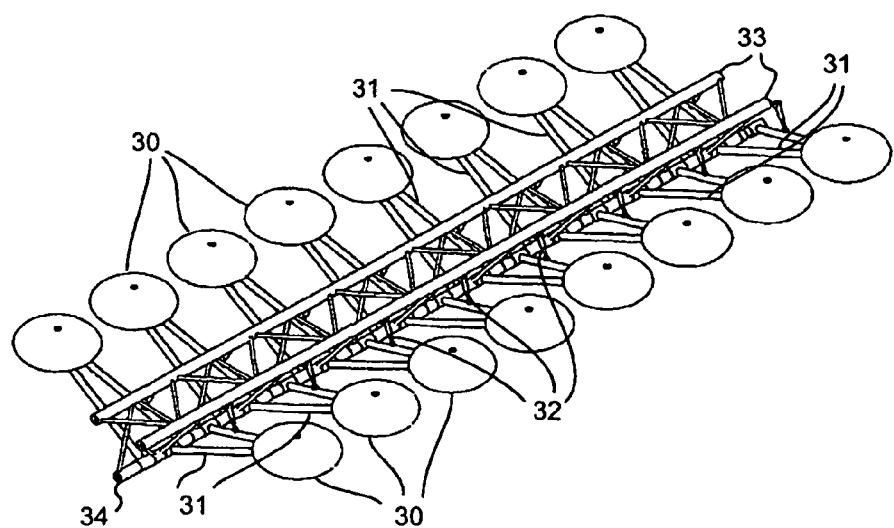
FIG. 14 is a perspective view of a second embodiment of a wave energy converter of the present invention employing a truss system for structure.

Refer to FIG. 14, which is a perspective view of the second embodiment of the wave energy converter of the present invention.

A plurality of pods 30 is mounted to lever assemblies/arms 31. The arms are hinged to a support member 34 of a base structure 33, 34. The base structure is constructed as a rigid truss system and further comprises two bars 33 arranged in parallel to the support member 34 so that the bars and the support form a triangular shape with the bars in the corners of the triangle. Between the support member and the bars 33 there are stabilizer bars or truss rails to provide stiffness in torsion, tension and bending of the truss system. Coupled to the arms 31 there are hydraulic pistons 32 which are actuated by the relative motion between the pods 30 and the base when the pods are moved by the waves in an up-and-down motion. In this example there is one piston actuated by each pod.

Figure 15:
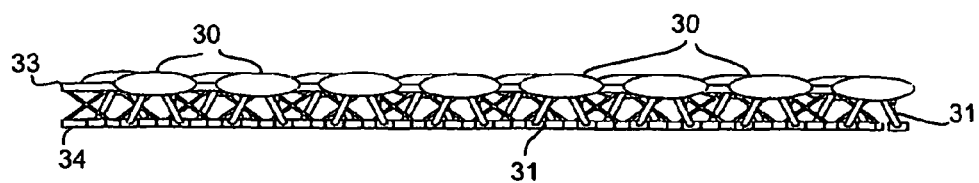
FIG. 15 is a side view of the wave energy converter of FIG. 14.

Refer to FIG. 15, which is a side view of the wave energy converter of FIG. 14. The main body length is such that the assembled length of modules will ensure optimal deflection of the pods for energy capture.

Figure 16:
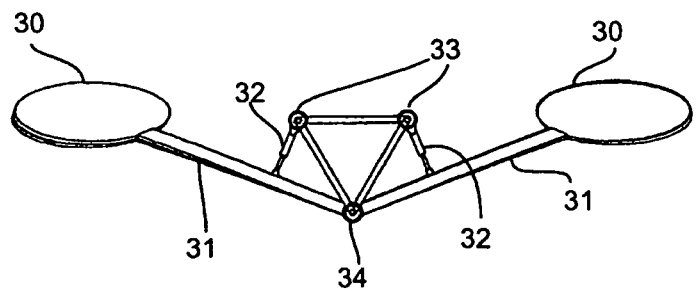
FIG. 16 is a an end view of the wave energy converter of FIG. 14.

Refer to FIG. 16, which is an end view of the wave energy converter of FIG. 14. The rigid truss system is connected to the pod arms and the double-acting piston. The truss rails are used as accumulators for the hydraulic system.

Figure 17:
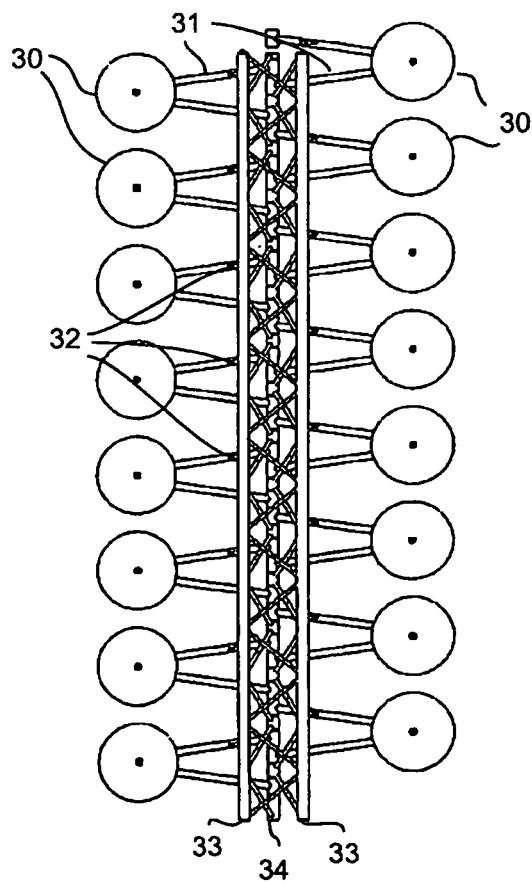
FIG. 17 is a top view of a the wave energy converter of FIG. 14.

Refer to FIG. 17, which is a top view of the wave energy converter of FIG. 14.

Figure 18:
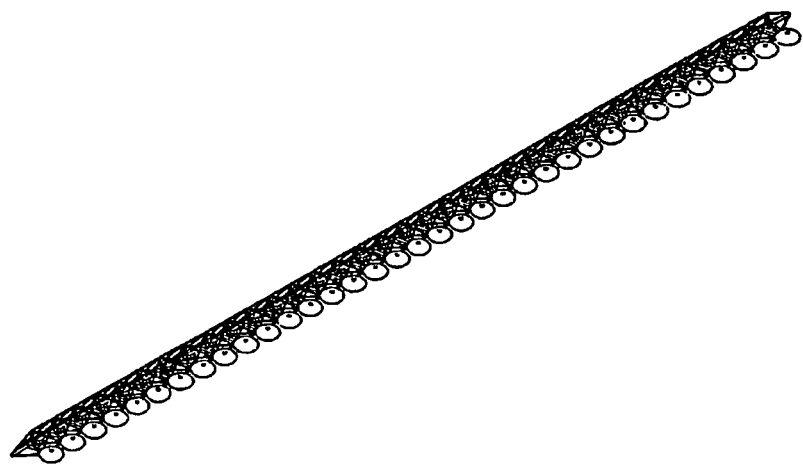
FIG. 18 is an isometric view of a second embodiment of a wave energy converter employing cable stays and spreaders for structure

Refer to FIG. 18, which is an isometric view of a wave energy converter with a cable-stayed base structure. The cables are arranged to provide stiffness in torsion, tension and bending.

Figure 19:
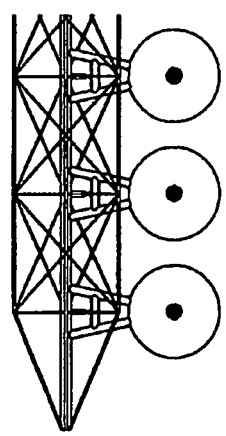
FIG. 19 is a top view of a section of the wave energy converter of FIG. 18.

Refer to FIG. 19, which is a top view of a section of the cable-stayed structure. A center tube provides structure and acts as the accumulator for the hydraulic system.

Figure 20:
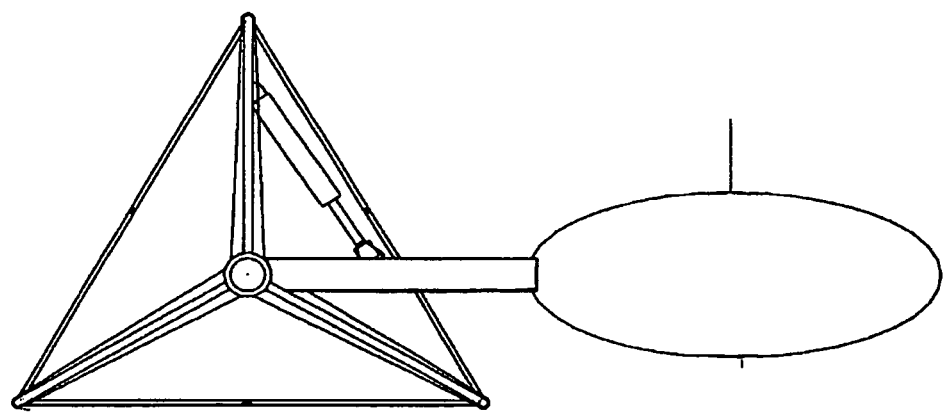
FIG. 20 is an end view of the wave energy converter of FIG. 18.

Refer to FIG. 20, which is an end view of the cable-stayed structure. Three spreaders allow for cables to be used throughout the length of the structure. The double-acting piston pump and pod are shown.

Figure 21:
FIG. 21 is a side view of the wave energy converter of FIG. 18.

Refer to FIG. 21, which is a side view of the wave energy converter of FIG. 18.

Figure 22:
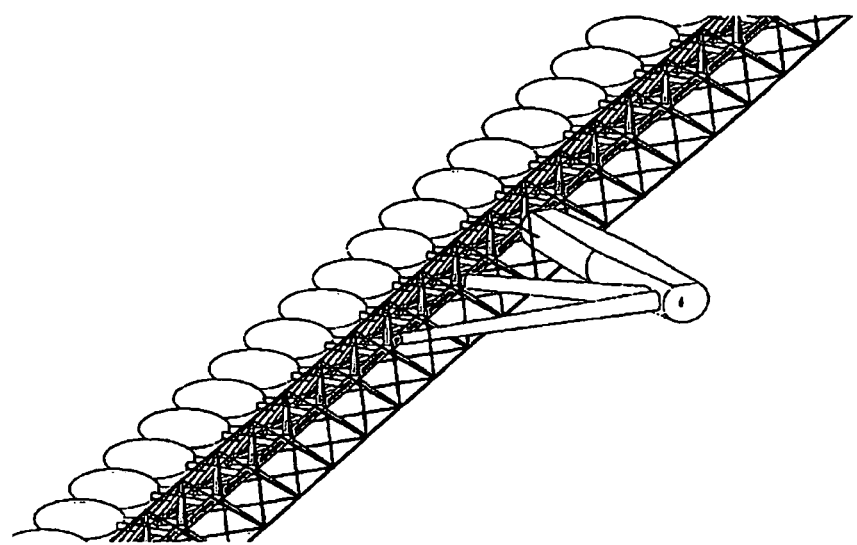
FIG. 22 is an isometric view of a wave energy converter utilizing a detachable power pod.

Refer to FIG. 22, which shows a wave energy converter according to the invention with a power pontoon to house the hydraulics and electrical generating equipment. The pontoon would be removable for service at sea.

Figure 23:
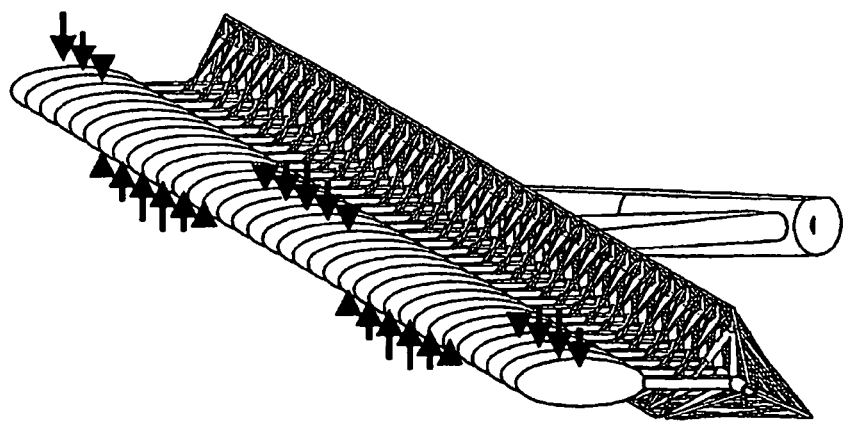
FIG. 23 is an isometric view of a wave energy converter utilizing a detachable power pontoon.

Refer to FIG. 23, which is an additional perspective view of the wave energy converter with a power pontoon.

Figure 24:
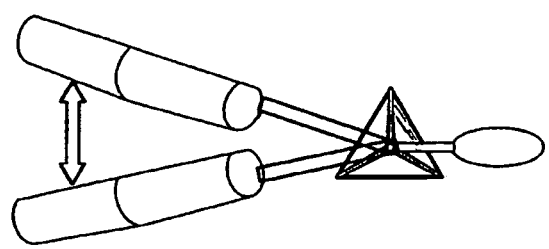
FIG. 24 shows a possible method to decouple the motion of the power pontoon from the main structure of the wave energy converter.

Refer to FIG. 24, which is an end view of the wave energy converter with a power pontoon decoupled from the wave energy converter main structure.

Figure 25:
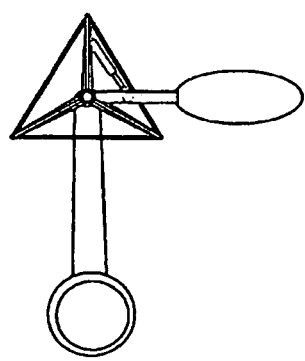
FIG. 25 is an end view of a wave energy converter with the power pontoon placed below the surface.

Refer to FIG. 25, which is an end view of the wave energy converter with a power chamber below the cable-stayed structure and below the surface.

Figure 26:
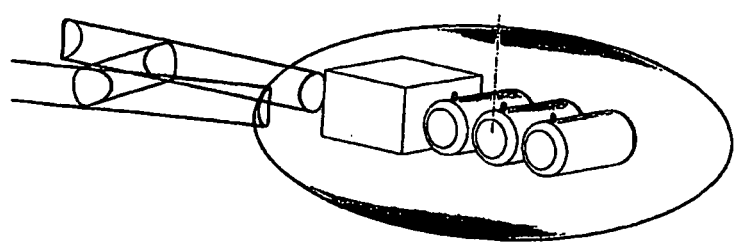
FIG. 26 is an isometric view of a wave energy converter pod housing various electric and/or hydraulic components.

Refer to FIG. 26, which is an isometric view showing assorted wave energy converter hydraulic and electric systems being moved into the wave pod, thus eliminating the power pontoon from the wave energy converter.

Figure 27:
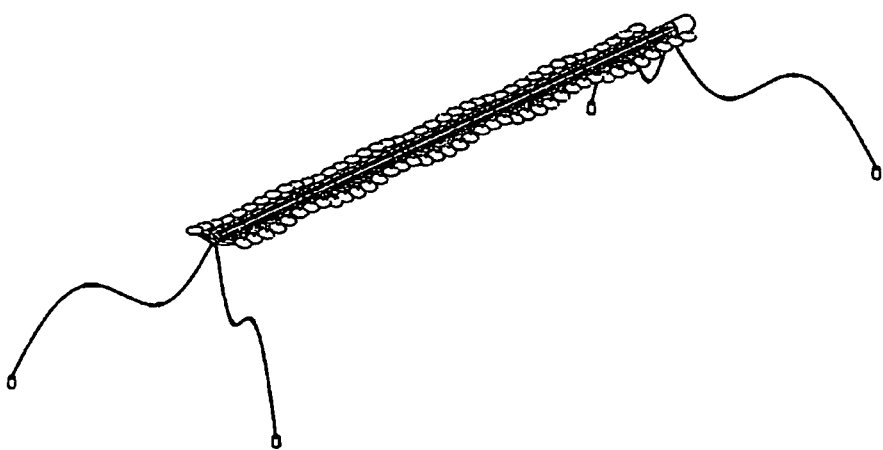
FIG. 27 is an isometric view of a tethered wave energy converter of FIG. 14.

Refer to FIG. 27, which is an isometric view of a four-point tethering arrangement for a wave energy converter. The output submarine power cable would run down one of the tethers.

Figure 28:
FIG. 28 is a side view of a tethered wave energy converter of FIG. 14.

Refer to FIG. 28, which is a side view of the system in FIG. 27.

Figure 29:
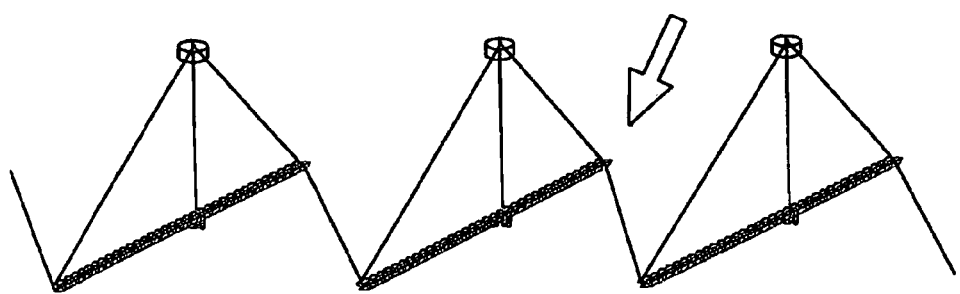
FIG. 29 is an isometric view of a mooring arrangement of a plurality of wave energy converters.

Refer to FIG. 29, which is an isometric view of a plurality of wave energy converters having a collective yaw control feature. The yaw mechanism is used to turn the wave energy converter for optimum exposure to the waves as the wave direction changes. For this purpose multiple converters are coupled via cables. Further the converters are moored to mooring points. By regulating the length of the cables (e.g. with a winch) the devices can be oriented in the right direction to the waves and a yaw control is provided.

Mooring points can be shared between multiple energy converters to reduce costs.

Figure 30:
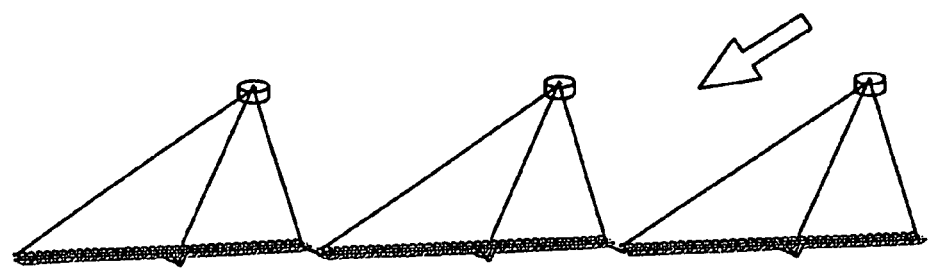
FIG. 30 is an isometric view of the mooring arrangement of FIG. 29 with a direction of wave travel.

Refer to FIG. 30, which is a depiction of the yaw control feature of FIG. 29 when the wave direction changes.

Figure 31:
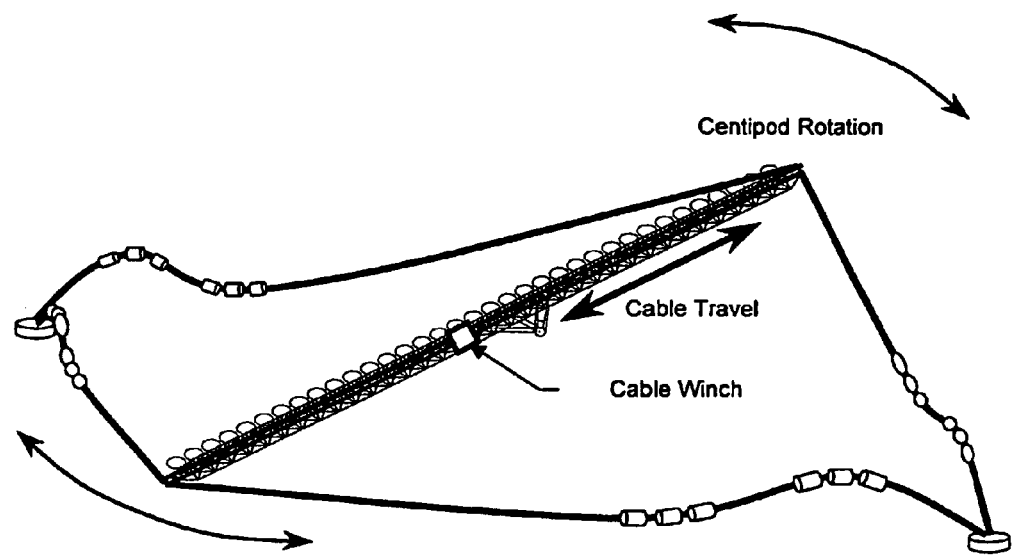
FIG. 31 is an isometric view of a single wave energy converter mooring and winch system.

Refer to FIG. 31, which is an isometric view of a single wave energy converter mooring system with cable winch control providing independent device yaw control to optimize the WEC orientation to the direction of the waves.

Figure 32:
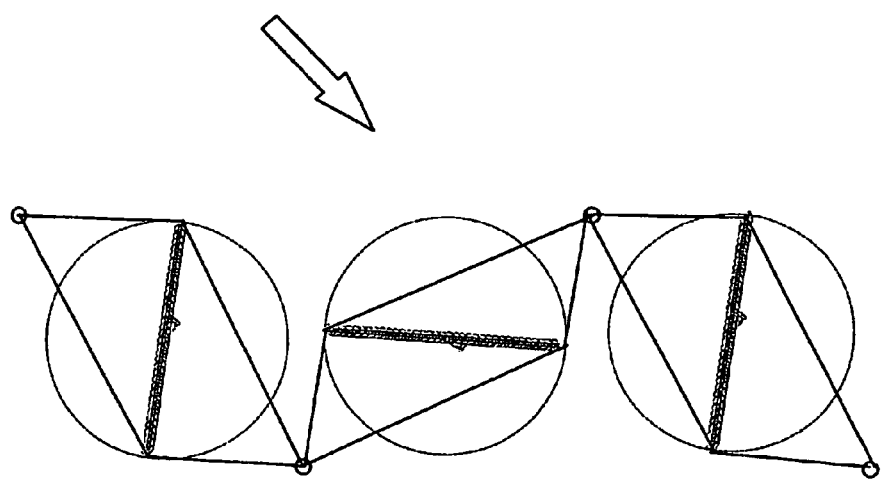
FIG. 32 is an isometric view of the mooring and winch system of FIG. 31 with a plurality of wave energy converters and shared moorings.

Refer to FIG. 32, which is a top view of the mooring system of FIG. 31 with a plurality of wave energy converters. Mooring points can be shared reducing costs.

Figure 33:
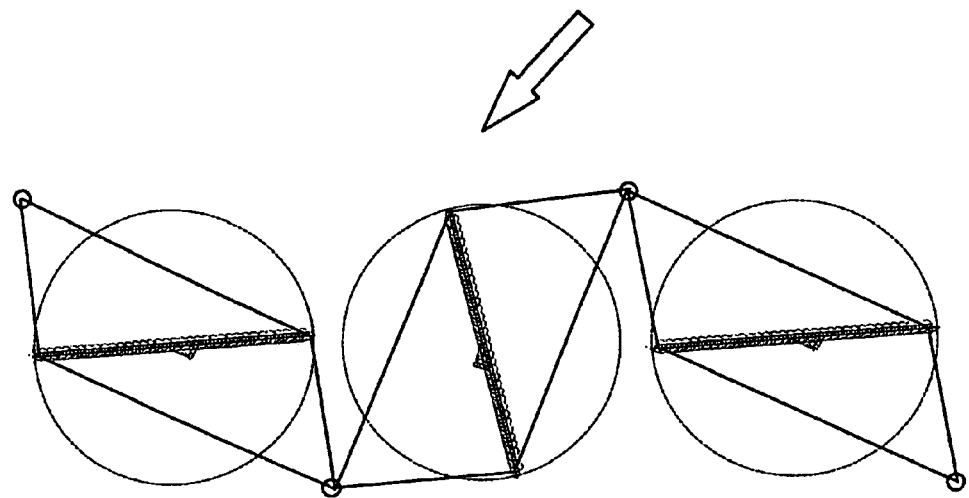
FIG. 33 is an isometric view of the mooring arrangement of FIG. 32 with a change in direction of wave travel and/or wind direction.
Figure 33A:
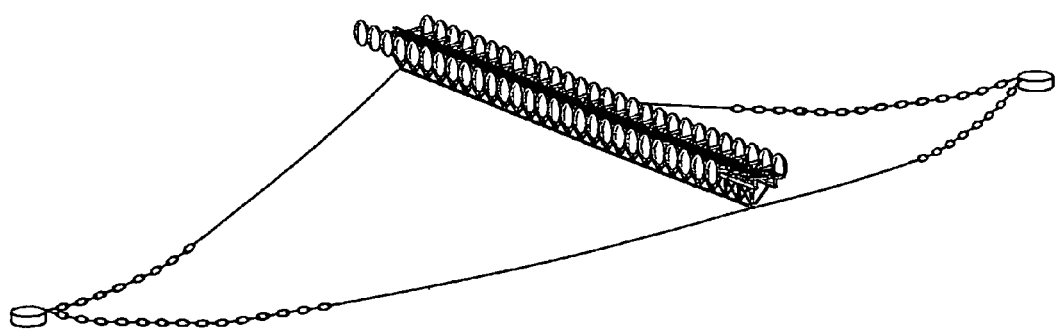
FIG. 33a is an isometric view of a single wave energy converter mooring system.

Refer to FIG. 33, which is a depiction of the yaw control feature of FIG. 31 when the wind and/or wave direction changes. This control feature adds increased redundancy to multiple wave energy converters as each is controlled independently.

Figure 33B:
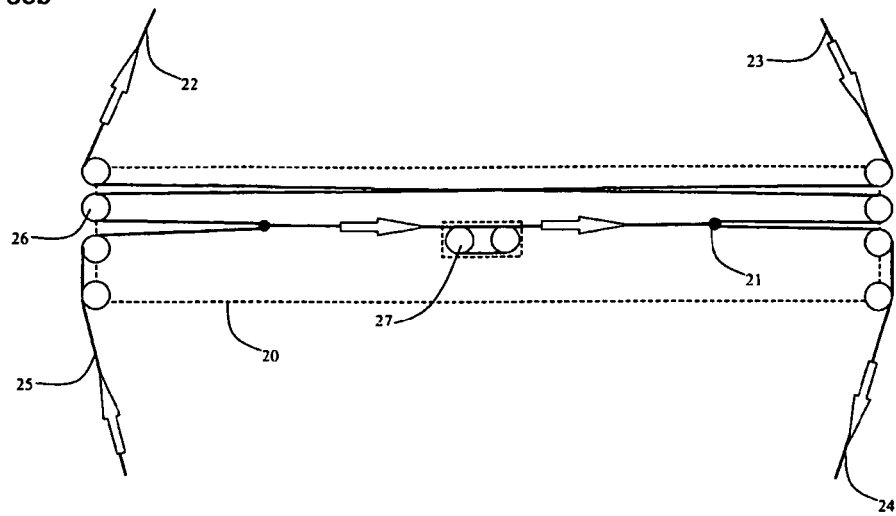
FIG. 33b is a schematic drawing of a mooring and winch system shown rotating counter clockwise with ability to rotate 60 degrees.
Figure 33C:
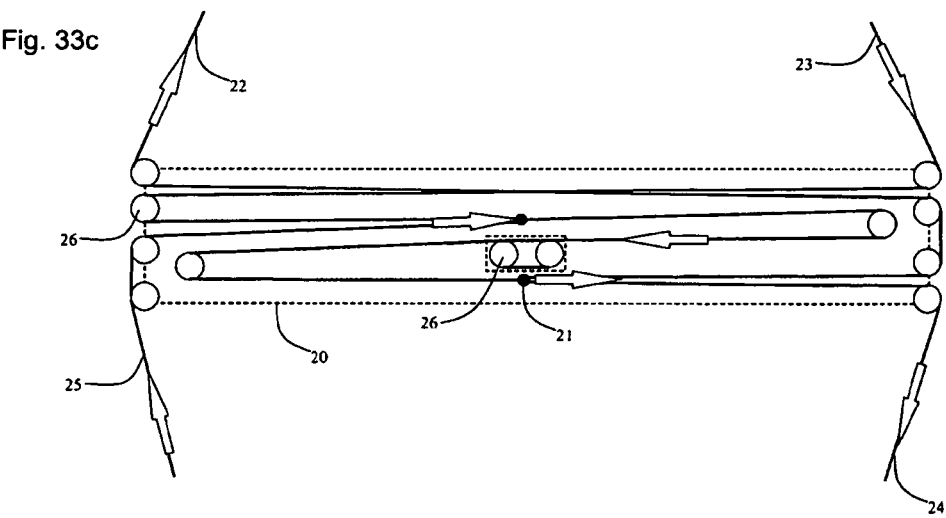
FIG. 33c is a schematic drawing of a mooring and winch system shown rotating counter clockwise with ability to rotate 120 degrees.
Figure 33D:
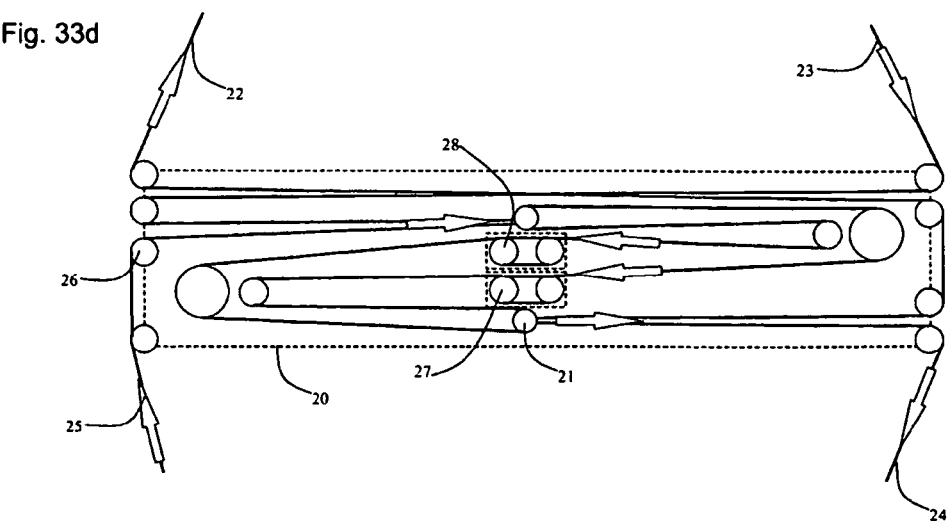
FIG. 33d is a schematic drawing of a mooring and winch system shown yawing (rotating) counter clockwise with redundant winches and the ability to yaw 120 degrees.

Refer to FIGS. 33a to 33d, which are a depiction of the yaw control feature of FIG. 31 when the wind and/or wave direction changes. FIGS. 33b to 33d show alternative mooring control systems. In FIGS. 33b to 33d references 20 refers to the energy converter representation (base structure with pods). Reference 21 refers to a cable junction and turning block. The references 22, 23, 24, and 25 indicate the mooring cables guided to the respective corners of the opposite ends of the structure's backbone. Reference 26 indicates the position of a turning block. The system further comprises a traction winch 27 as well as a redundant traction winch 28 (FIG. 33d).

Third Embodiment of the Invention

Figure 34:
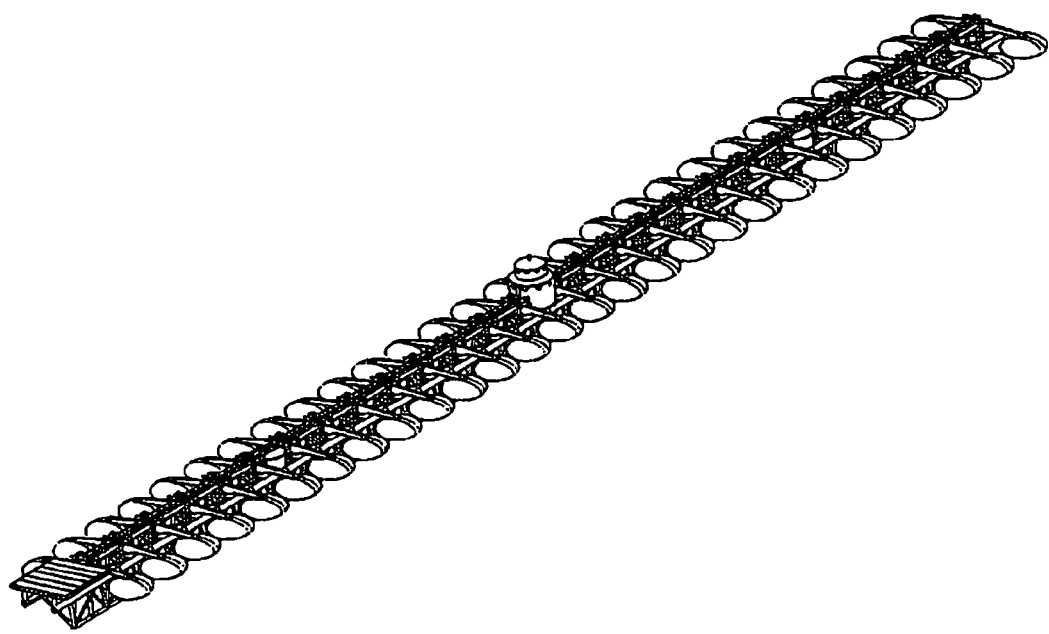
FIG. 34 is an isometric view of a wave energy converter according to a third embodiment of the invention.

Refer to FIG. 34, which is an isometric view of a wave energy converter according to a third embodiment of the invention on the surface of the ocean. The device is moored at a variable angle to an incoming ocean wave and delivers power to a shore grid via a submarine cable from a generator located in a central main powerhouse. A hydraulic system controls the movement of the pods by using the energy of a wave to activate the hydraulic system. The hydraulic system includes an impulse turbine and an impulse turbine nozzle, which automatically adjusts a locking force of a pod with changing wave heights. The wave energy converter (WEC) extracts power from waves on both the up and downswing of the waves. The up and down motion of the waves cause multiple pods to move up and down. The up and motion of the pods actuate hydraulic pistons that pump hydraulic fluid to a nozzle that drives an impulse turbine. A Pelton wheel is of a type of impulse turbine. The water under pressure, which is introduced by the nozzle into the casing of the impulse turbine, is accelerated when it is forced to flow through the nozzle. The high-velocity jet from the nozzle impinges on buckets around the turbine wheel to cause the wheel to rotate about a shaft. The shaft is connected to an electric generator. The impulse turbine can be replaced with any hydraulic turbine such as any rotary engine that takes energy from moving fluid, including hydraulic motor, impulse turbine, or Pelton wheel.

A Way to Obtain Optimum Energy Extraction

Figure 35:
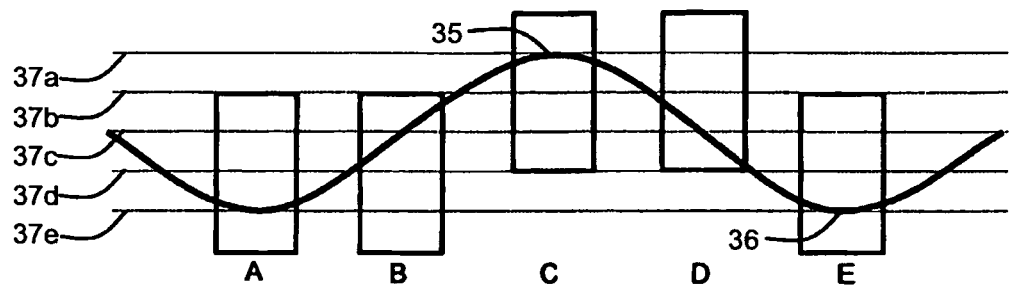
FIG. 35 is a diagram depicting optimum energy extraction from a wave by a buoy, such as one of the pods shown in FIG. 34.

Refer to FIG. 35. For optimum energy extraction from a wave by a buoy, discounting a resonant situation, the following cycle should be followed:

(1) The buoy should be held at a fixed height (A) until the waterline rises to a depth of ¼ of the wave height above neutral 37c (B).

(2) The buoy should then be allowed to rise to the crest 35 of the wave at a constant buoyancy force generated by the increasing water height (C). The resulting buoy stroke is equal to ½ of the wave height.

(3) When the buoy reaches the crest 35 of the wave it should be held at that height until the water line falls to an amount of ¼ wave height 37b below neutral 37c (D).

(4) The buoy should then be allowed to fall to the trough 36 of the wave at a constant force generated by the decreased water height (E). The resulting buoy stroke is equal to ½ of the wave height.

Hydraulic Circuit

Figure 36:
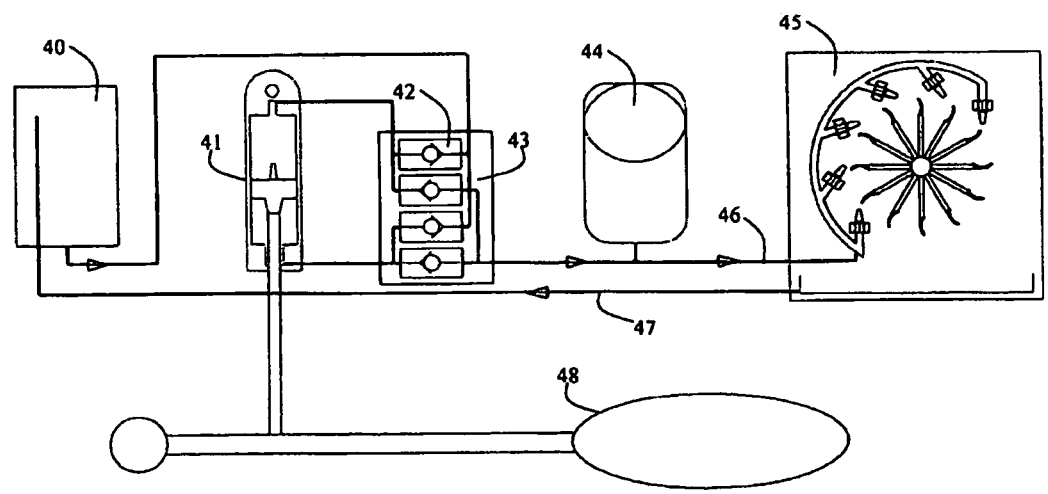
FIG. 36 is a diagram of the hydraulic system that controls the pods shown in FIG. 34.
Figure 37:
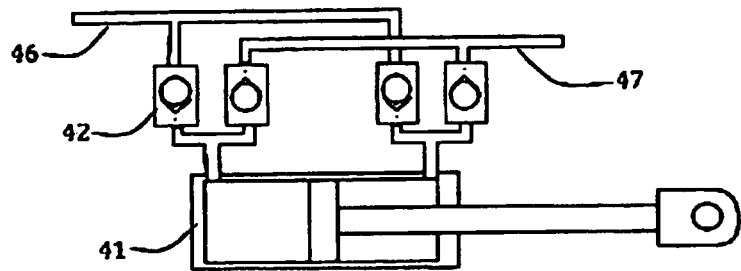
FIG. 37 is a diagram depicting the operation of the double acting hydraulic pump that extracts energy from the motion of the pods.

Refer to FIGS. 36 and 37. The hydraulic system can be an open or closed circuit, which can include a reservoir 40, one-way check valves 42, a cushion stop/double acting hydraulic ram pump 41 driven by a pod 48, whose up and down motion about a pivot drives a piston rod. The one-way check valves 42 within the hydraulic manifold 43 open and close to control the flow of fluid in the system. An optional hydraulic accumulator 44 can be provided to level the power output. The hydraulic manifold 43 forces fluid through the high-pressure line 46 to the nozzles to turn the hydraulic motor or impulse turbine 45. A low-pressure line 47 return path returns the fluid to the reservoir 40 or in an open sea water system the fluid is returned to the ocean. A hydraulic motor is a mechanical actuator that converts hydraulic pressure and flow into torque and angular displacement. The term hydraulic turbine as used herein is any rotary engine that takes energy from moving fluid, including hydraulic motor, impulse turbine, or Pelton wheel.

Sample Hydraulic System Operation

At rated power, for example from a $3m$ wave, the pods would be submerging and surfacing 0.75 m before they start moving and they would have a throw of 1.5 m. The hydraulic pressure would be 3000 psi (maximum) and a flow rate of 1 unit.

If the wave height drops to 1 m or ⅓ of rated, the pods would want to submerge and surface 0.25 m, which would require a hydraulic pressure of ⅓ of rated or 1000 psi. The throw would also drop to ⅓ of rated or 0.5 m, which would reduce the flow rate to ⅓ units.

If utilizing an impulse turbine to power a generator, the fluid is squirted through nozzles that turn a paddle wheel. As the flow rate through the nozzles goes down, the pressure also goes down nearly linearly. So if the pressure powering the wheel drops to ⅓ of original, the back pressure would automatically drop to ⅓. This is the same relationship between pressure and flow rate that the pods need to maintain optimum performance. In this way, the pods are self tuning, maintaining optimal performance automatically.

The impulse turbine, at constant RPM, also stays in its efficiency range for a wide range of wave heights. For larger waves the power is maintained at rated by limiting the hydraulic ram throw and pod size.

If a hydraulic accumulator 44 is used to level the power output, it would also delay the tuning of the pods (i.e. if the max pressure is built up, the pods would have to see enough energy to overcome the stored hydraulic pressure prior to capturing more energy). For this reason it may be preferable to level the power in another way Refer to FIG. 37, which illustrates how the hydraulic system accomplishes a locking of motion until a set force is reached as well as causing a constant resistance to pod motion.

Initially, there is no force on the piston because the pressure on either side of the piston 41 is equal. When the force on the piston is less than the activation force, the piston moves an infinitesimal amount and the pressure on one side increases and the pressure on the other side decreases until the forces are balanced and motion stops.

When the force on the piston is equal to the activation force, the inlet and exit valves 42 open. The piston moves with constant activation force. Low-pressure fluid 47 fills the expanding side and high-pressure fluid 46 exits the contracting side.

Figure 38A:
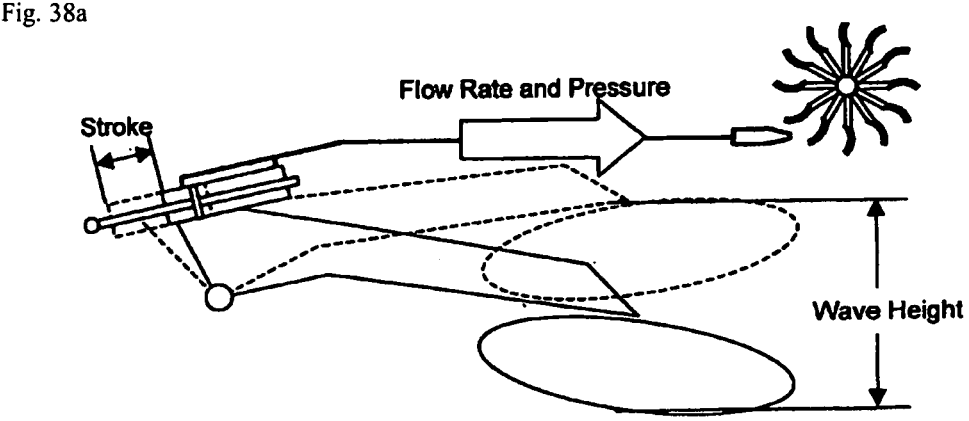
FIGS. 38a-38b are diagrams depicting how an impulse turbine nozzle automatically adjusts the locking force of the pod with changing wave heights.
Figure 38B:
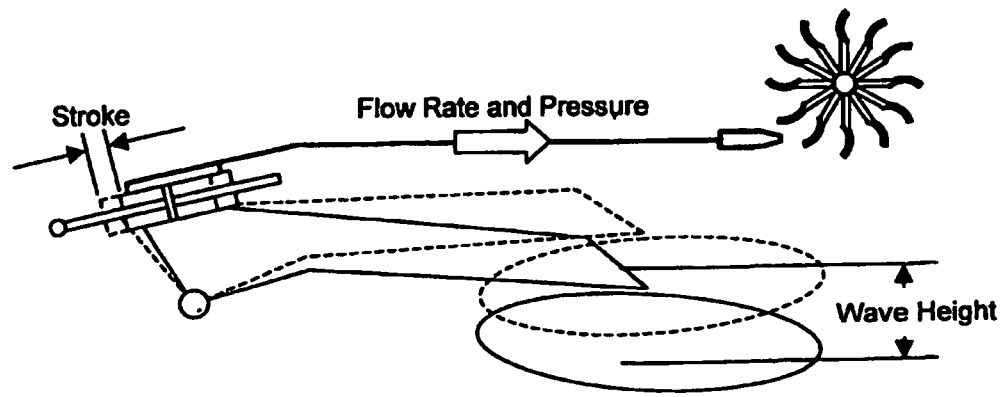

Refer to FIGS. 38a-38b, which illustrate how an impulse turbine nozzle automatically adjusts the locking force of the pod with changing wave heights.

In FIG. 38a, large waves generate a large stroke and the large stroke gives a large flow rate. The large flow rate causes a high hydraulic backpressure, which requires a large force to move the hydraulic ram. The large force increases the immersion of the pod helping to maintain ¼ wave height and the increased immersion with increased wave height optimizes energy production.

In FIG. 38b, small waves produce a small stroke, small flow rate, low hydraulic pressure, low ram force, and less immersion of the pod. By setting the nozzle size, hydraulic system and pod number and geometry, the self-tuning of the pod force with wave height helps to maintain optimal performance.

Figure 39:
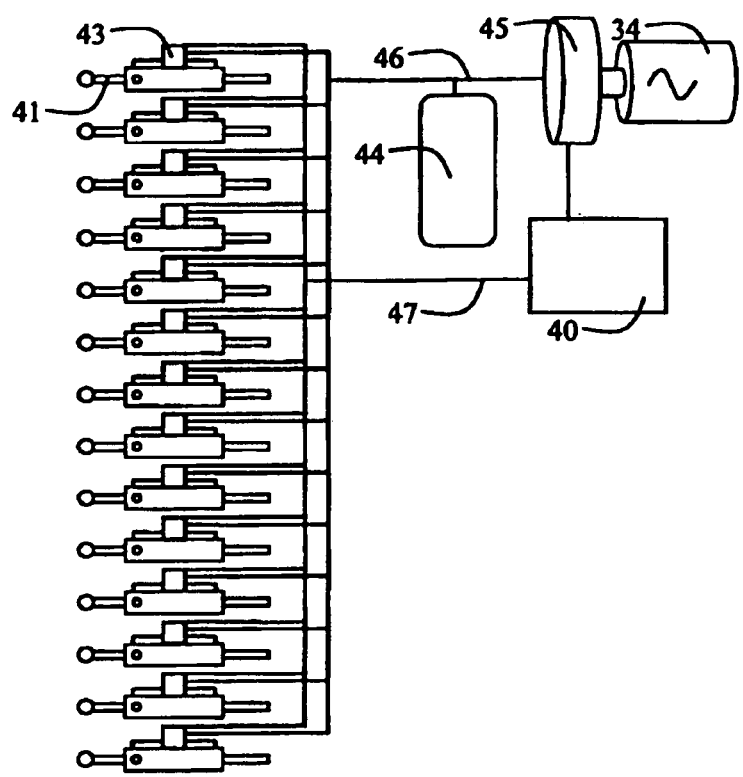
FIG. 39 is a drawing of the multiple pod wave energy converter shown in FIG. 34.

Refer to FIG. 39, which is a detailed drawing of the wave energy converter shown in FIG. 34. The hydraulic ram 41 and hydraulic manifold 43 shown in FIGS. 36 and 37 are replicated along the spine of the wave energy converter. A high-pressure line 46 connects the manifolds 43 to a common pressure accumulator 44 and hydraulic motor or impulse turbine 45. The hydraulic motor or impulse turbine 45 drives a common generator 34. The spent fluid from the hydraulic motor or impulse turbine 45 is collected in a hydraulic reservoir 40, which returns the fluid to the manifold 43 via a low-pressure return line 47.

Fourth Embodiment of the Invention

According to a fourth embodiment of the invention the power-generating apparatus includes a center section, one or more outer satellite sections connected to the center section and a powerhouse located at the center section. The hydraulic turbine may be an impulse turbine or hydraulic motor. The device is moored at a variable angle to an incoming ocean wave and delivers power to a shore grid via a submarine cable from a generator located in the central main powerhouse.

In accordance with an aspect of the invention the powerhouse collects the satellite module's electrical production and provides an exit from the apparatus to the ocean floor where power is transferred to shore via a submarine cable.

In accordance with an aspect of the invention an outer section is modular and contains a single, satellite powerhouse which gathers the outer section's pressurized hydraulic flow and generates electricity that is wired into the main center powerhouse for power conditioning and transmission via the submarine cable.

In accordance with an aspect of the invention the center powerhouse and all satellite powerhouses submerge to avoid wave slapping loads and instances in large storm waves where a large part of the length of the structure may become unsupported by seawater.

Figure 40:
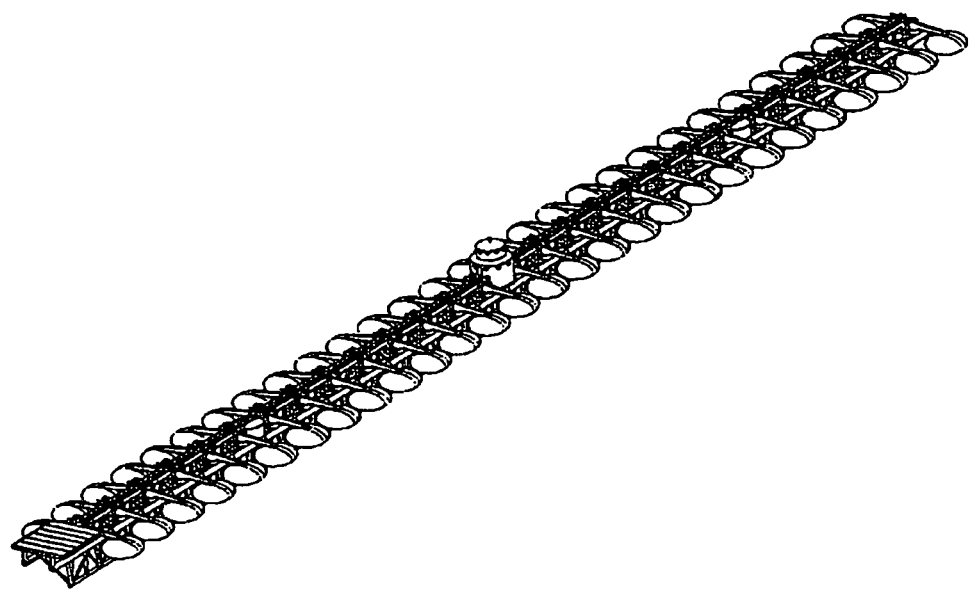
FIG. 40 is a perspective drawing of a fourth embodiment of the invention showing the location of the powerhouse in the center of the structure.
Figure 41:
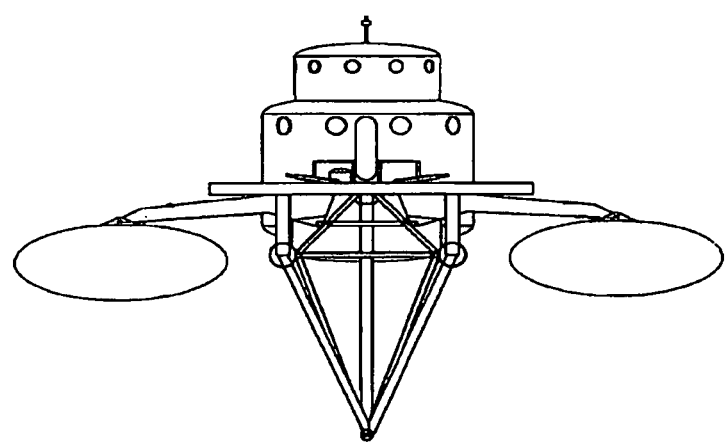
FIG. 41 is a cross-sectional view of the apparatus of FIG. 40 showing a front view of the powerhouse.

Refer to FIG. 40, which is an isometric view of a wave energy converter of the present invention on the surface of the ocean. The device includes a plurality of force transmitting pods, double-acting hydraulic rams engaged with the arms of the force transmitting pods, and a Pelton wheel driven by high-pressure working fluid which is engaged to a generator.

Refer to FIG. 42 and FIG. 43. FIG. 43 is a top view and FIG. 42, is a side view of a wave energy converter of the present invention. The wave energy converter (WEC) is an electric power-generating device, which is driven by ocean wave action. The device is moored by its ends and can be yawed to maximize power extraction and delivers power to a shore grid via a submarine cable from the main powerhouse.

The wave energy converter is designed to optimize the capture of energy from waves using a plurality of pods in modular constructed sections containing powerhouses for electricity production. The advantage of this construction is commonality in a large device for economic, operating and service reasons plus allowing for the device length to exceed long period wavelengths, which results in a stable platform for the pods to work against maximizing wave power extraction. Traditional shipbuilding methods can be employed.

The pods capture energy on the up and downswing of the waves and impart force to two-way, double-acting hydraulic rams. The rams pump a working liquid, such as hydraulic oil or seawater, and liquid pressure is used to drive a Pelton wheel or other hydraulic motor and a generator system to generate electricity.

The construction consists of a center section which houses hydraulic systems, power conditioning, step up transformers and switchgear. This main powerhouse not only produces its own main section's electricity, it collects the entire satellite module's electrical production and provides the exit from the device to the ocean floor where power is transferred to shore via a standard submarine cable.

The outer sections shown in FIGS. 43 and 45 are completely modular and contain a single, satellite powerhouse which gathers each section's hydraulic pressure generated and generates electricity that is wired into the main center powerhouse for power conditioning and transmission via a submarine cable to shore.

The center and all satellite powerhouses are designed to submerge to pressures up to several atmospheres to survive extreme weather events. The entire device is designed to submerge to avoid wave slapping loads and instances in large storm waves where a large part of the length of the structure may become unsupported by seawater.

Fifth Embodiment of the Invention

According to a fifth embodiment, the apparatus for generating power utilizing ocean waves includes a plurality of force transmitting pods, double-acting hydraulic rams engaged with the arms of the force transmitting pods, and a hydraulic turbine driven by high-pressure working fluid which is engaged with a generator. The apparatus includes chambers in the pods, which can be flooded with seawater for submerging and evacuating of the seawater for surfacing. The hydraulic turbine may be an impulse turbine or hydraulic motor.

In accordance with an aspect of the invention the pods can be raised to a vertical position for submerging and surfacing and for transporting the WEC.

The wave energy converter (WEC) according to the fifth embodiment extracts power from waves on both the up and downswing of the waves. However, this results in an inherent inability to raise the pods and structure out of major storm waves. The current embodiment employs a variable buoyancy apparatus and method to (1) assist in the deployment of the WEC to a wave farm, to (2) optimize energy capture in the operating mode and to (3) totally submerge the device to avoid huge wave slapping loads and avoid instances where a large part of the structure may not be supported by seawater.

Figure 46:
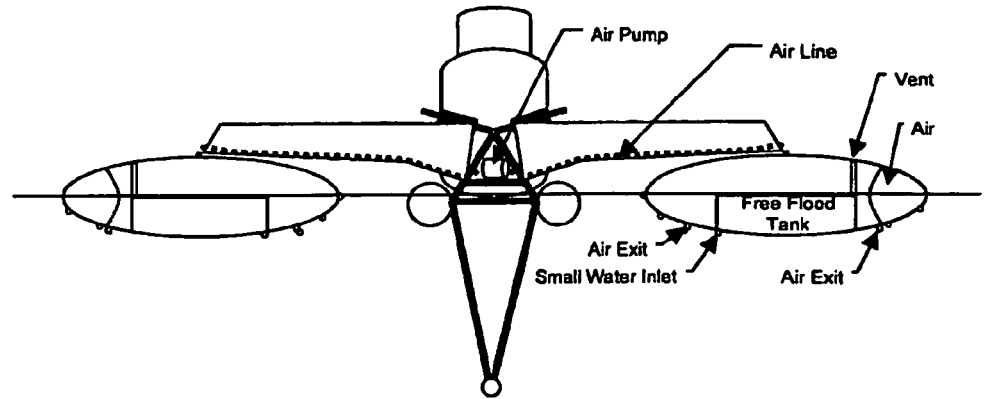
FIG. 46 is a front elevation drawing of a fifth embodiment of the invention showing the device subsystems depicted in the operating mode at sea.

The device ballast subsystems are depicted in FIG. 46 in the operating mode at sea. There is a defined amount of ballast provided by flooding a pod's free flood tank to a certain level. This optimizes wave energy capture on the up and downswing of the waves as previously described.

Figure 47:
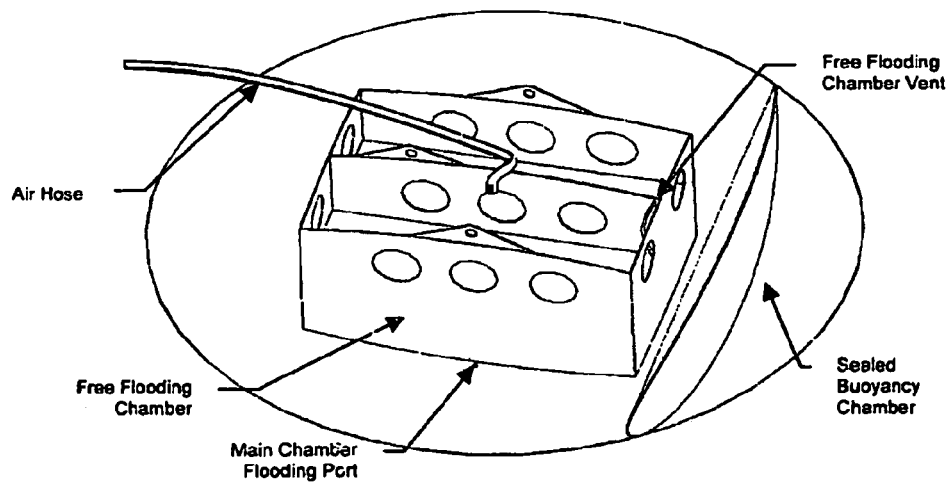
FIG. 47 is an isometric view of the apparatus of FIG. 46 showing the detail of a pod ballasting system.

FIG. 47 shows the detail of the pod ballasting systems shown in FIG. 46. The defined flooded area for operational ballast is shown with a small water inlet that is always open and an air exit outlet. One small area (sealed buoyancy chamber) in the pod remains sealed with air to provide for minimal buoyancy in the case of submergence when the balance of the pod is allowed to flood. An air pump and air hose line evacuate the water by air displacement when the device needs to be surfaced for further operation or maintenance.

Figure 48:
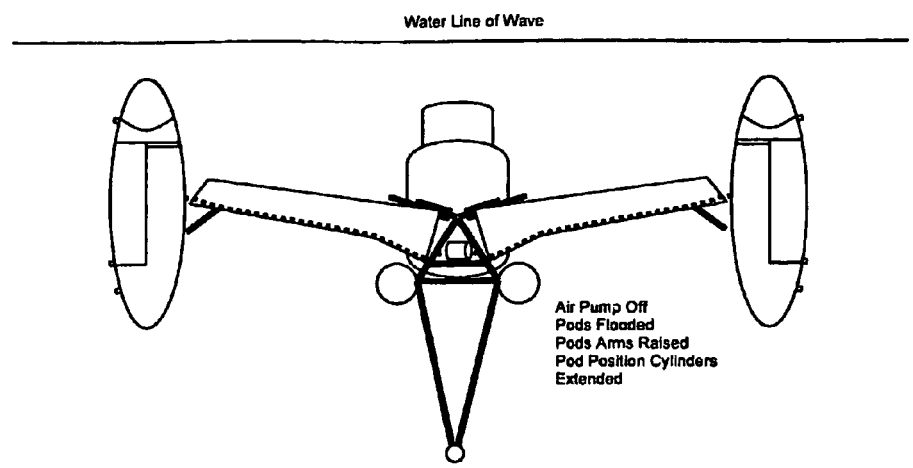
FIG. 48 is front elevation view of the apparatus of FIG. 46 showing the pods rotated, and the device submerged below the ocean surface.
Figure 49:
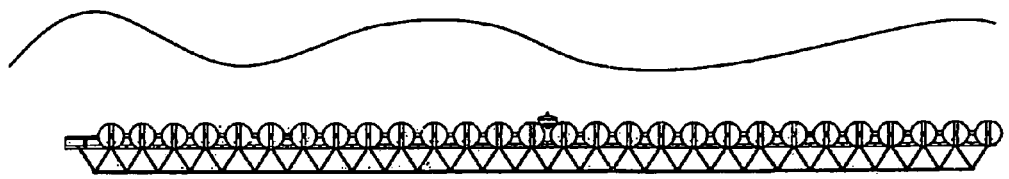
FIG. 49 is a side view of the submerged device of FIG. 48.

FIG. 48 shows a submerged WEC. Upon notification of major storm waves or a singular wave event, which might harm the device, the pods are flooded to add ballast and reduce overall device buoyancy. Hydraulic rams at the pod arm-pod interface are actuated to rotate the pods to the vertical orientation shown. Thus, with the air pump off, the pod flooded with seawater, the pod arms raised with the pod position cylinders extended, the device submerges to a prescribed depth, well below the trough of major storm waves. FIG. 49 shows the submerged WEC.

Figure 50:
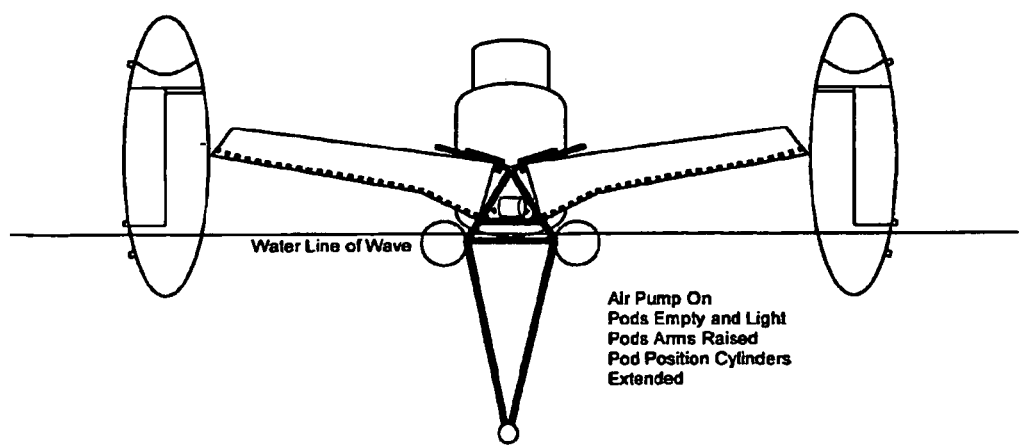
FIG. 50 is a front elevation view, which shows the pods rotated for the deployment leaving port and bringing the device to the wave farm site.

FIG. 50 shows a deployment method for leaving port and bringing the device to a wave farm site. The pods are placed in the vertical orientation fully emptied of seawater ballast and the device towed. Thus, with the air pump on, the pod emptied of seawater, the pod arms raised with the pod position cylinders extended, the device surfaces to the water line of waves.

Sixth Embodiment of the Invention

Figure 51:
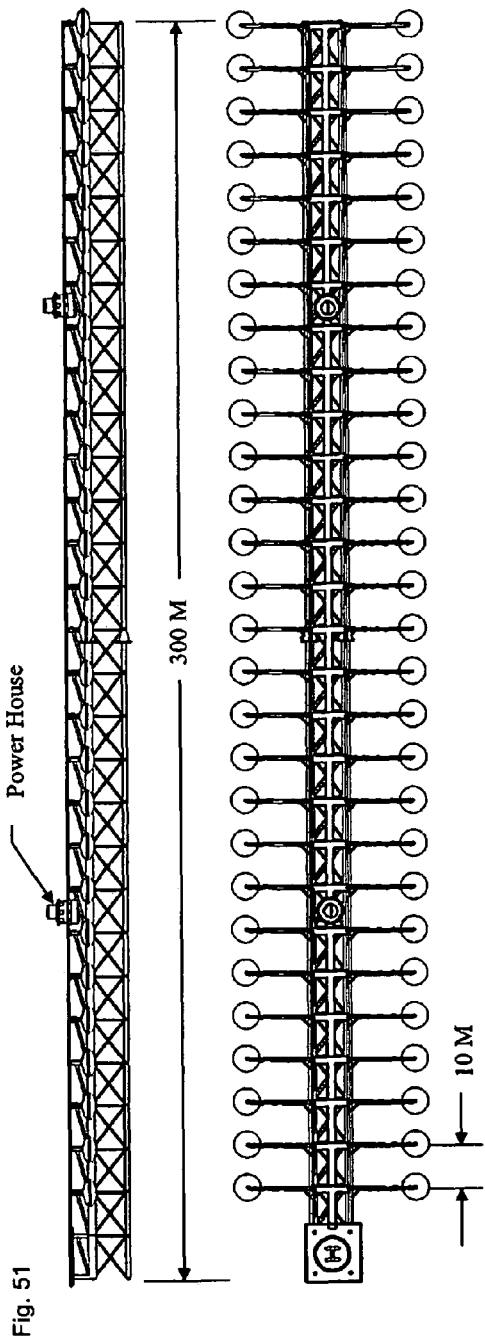
FIG. 51 is a combined top and side view of a sixth embodiment of the invention.
Figure 52:
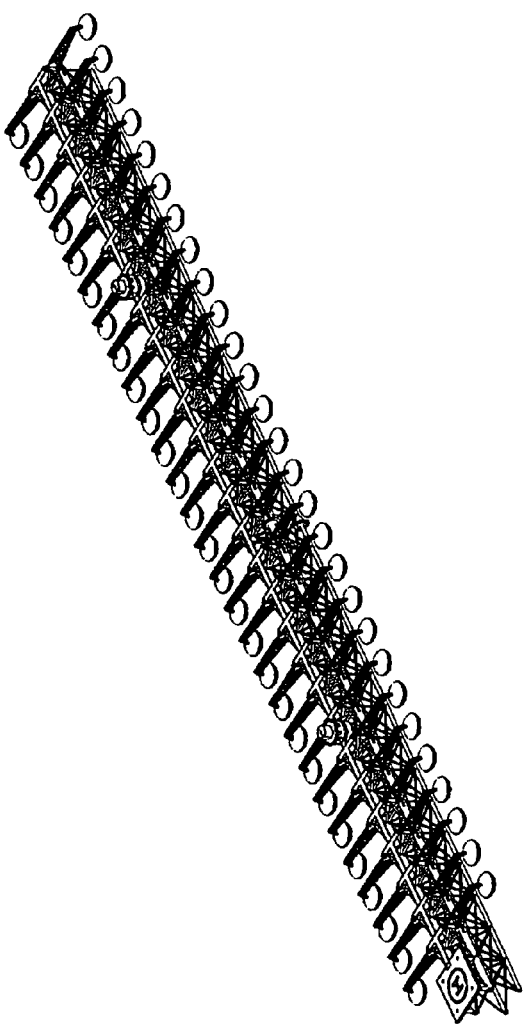
FIG. 52 is an isometric drawing of a sixth embodiment.

Refer to FIG. 51 and FIG. 52. FIG. 51 is a combined top view and a side view of a wave energy converter of the present invention. The wave energy converter (WEC) is an electric power-generating device, which is driven by ocean wave action. The device is moored by its ends and can be yawed to maximize power extraction and delivers power to a shore grid via a submarine cable from the main powerhouse. The backbone (base structure) of the converter comprises to section connected via a joint structure. FIG. 52 is perspective drawing of the sixth embodiment.

Figure 53:
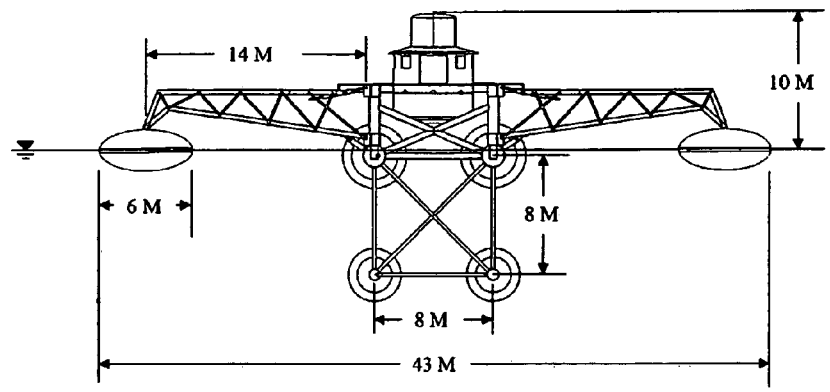
FIG. 53 is a front elevation drawing of the sixth embodiment of the invention showing the rectangular backbone (base structure)

FIG. 53 is a front elevation drawing of the sixth embodiment of the invention showing the rectangular backbone (base structure). To achieve a strong and robust backbone a square framing system was developed with four large diameter legs at each corner of the square with small diameter tubular braces at each face of the unit providing the framing system along the length of the backbone as well as each panel level where the pod loadings are transmitted to the backbone through pod arms.

The basis for selecting a combination of large and small diameter tubes is to minimize the applied loading on the backbone. Maximum vertical forces due to water particle velocities on the small diameter tubes occur out-of-phase (90 degrees in advance of the crest line) with the maximum vertical forces due to water particle accelerations (and variably buoyancy forces acting in opposition) on the large diameter tubes at the crest line. The converter backbone is a very long and slender structure accommodating 28 sets of 56 pods and pod arms. The four tubes of the backbone and the small diameter braces at each of the four sides of the backbone and a total of 30 cross-frames provide the rigidity to the backbone. Twenty-eight of these cross-frames provide the structural integration of the pods and pod arms with the backbone.

The critical loading conditions affecting the backbone are hogging when the wave crest is at the backbone mid-span and the sagging condition when the two wave crests are at each end of the backbone with the trough being at the mid-span. The backbone can be designed to have adequate capacity to accommodate a reasonable level of hogging and sagging loads due to wave loads acting directly on the backbone and the loads being transmitted from the pods to the backbone.

These applied direct and indirect loads acting on the backbone create a bending moment that is the maximum at mid-span. The bending moment translates into axial tension and compression forces on the large diameter corner legs of the backbone. Since the bending moment for each sea state would be different, it is desirable to consider the target capacity for the backbone so that structural integrity of the system is maintained and the overall costs remain reasonable.

According to this embodiment, the backbone is constructed in two equal segments, with one end of the backbone stabbed into the other. Each of the four stab-on elements provide for locking in of each of the four legs to provide continuity of the system. Thus, until a storm event creating a bending moment and axial forces compatible with the lock-in system capacity, the backbone functions as a single unit.

Figure 54A:
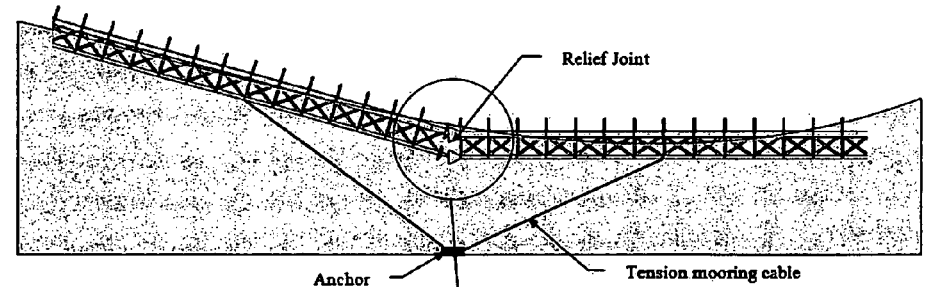
FIG. 54a is a schematic side view of a multi-section backbone and relief joint according to the sixth embodiment of the invention.
Figure 54B:
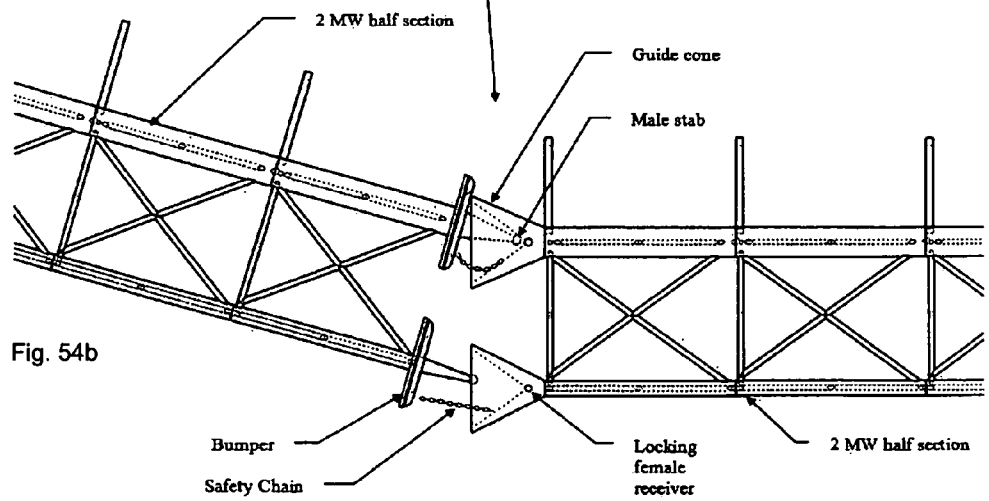
FIG. 54b shows a detailed view of the joint between the sections of the backbone.

FIG. 54a is a schematic side view of a multi section backbone according to the sixth embodiment of the invention. FIG. 54b shows a detailed view of the joint between the sections of the backbone.

When the axial loads exceed the lock-in capacity, the stab-on legs are released but remain within the guides. In the released condition rotational flexibility is provided to nullify the effect of applied loads creating bending moment.

The pre-tensioned guy wires are intended to keep the two halves of the unit very close to each other. However, a supplemental safety system is also provided by attaching 2 to 3 m long chains that would prevent the stab on legs from getting out of their guides. Cushions or rubber bumpers on the system can prevent large movements along the longitudinal axis of the backbone.

The architecture provides for an effective way to reduce cost through scaleability. The modular design of the sixth embodiment allows the system to be scaled to a size which is most cost-effective from a mooring and operational standpoint. The embodiment accomplishes this by combining 56, 80 kW point absorber pods onto a single 214 m long semi-submerged carrier structure that is exposed to the wavefront at ~45° and can yaw in response to change in direction of the wavefront. It is planned that the core system will be 2.24 MW with 28 pods. An additional 2.24 MW module completes the 4.5 MW converter, with a compliant section at the middle. Further extensions may be possible in the future.

The use of proven technology and commercially available components reduces technical issues, costs, and allows for a more rapid commercialization process. Most components used in the embodiment are available through industrial catalog sources significantly reducing the "teething costs" typically associated with newly designed components in early stage commercialization. Furthermore, leveraging proven processes and experience from the offshore oil and gas industry for survivability, operability and safety allows for predictability in the design, implementation, and certification process. The embodiment also benefits from some three decades of experience in heaving point absorbers gained through tank testing, subscale testing, and modelling. As such, the performance and dynamic response is well understood, and commercialization is not hindered by the need for long research projects.

Being able to carry out regular maintenance and repair activities in normal sea-state conditions insures that O&M (Operations & Maintenance) costs are predictable, and if a problem arises, it can be rectified in a timely manner. This requires personnel to be able to access and safely carry out operational activities on-board. The design criteria for this embodiment is to have a >90% accessibility, which translates directly to improved generating system availability, and significantly enhances LCOE (Levelized Cost of Energy). This is achieved by providing safe access to all critical components by elevated ramps, well above the ocean waves. The elevated ramps also incorporate a rail for the service crane, which can travel the full converter structure length to the boarding platform for the service boat. Personnel transfer is accomplished by service boat or helicopter.

System modularity simplifies manufacturing and reduces O&M costs by allowing for sub-systems to be easily replaced with the on-board service crane. The modularity allows for individual components to be man-manageable with the on-board crane avoiding the expense of shipboard mounted cranes. The float pods, hydraulic rams, hydro-turbines, and generators can be removed using the on-board crane.

Ease of Deployment and reduced installation costs are based on towing the converter structure to site and the use of gravity anchors for mooring, avoiding ocean floor mounted structures as with some wave devices.

Redundancy is built into the converter subsystems to gain high availability and reduce the chance of a failure, which would result in a catastrophic loss. There are multiple levels of redundancy built in, and particular attention is paid to failure modes and how they affect the overall system. All critical systems, including control system, moorings, etc., have some built-in redundancy.

Highly efficient absorption and power conversion process, measured as the amount of structural material (cost) that is required to achieve a desired electrical output (kWh/year). Multiple optimally sized, shaped, and tuneable point absorber pods, mounted on the backbone carrier result in highly efficient wave power conversion. The interaction between the wave action and the timing of the engagement of the hydraulic rams yields a significant increase in energy conversion. Compared with some of the most mature devices under development, the embodiment of the invention has a structural weight-to-power ratio that is about two to five times better.

Pod efficiency is also enhanced by the length of the carrier designed to "straddle" typically two to three wave lengths, thereby minimizing pitching at the expense of absorption and power conversion by the pods.

Pod efficiency is also gained with optimized exposure to wavefront by the converter according to the invention yawing to about a 45° angle to the oncoming wave line exposing all pods to maximum wave action. The yaw system allows a 90° change in orientation of the converter.

The architecture has embraced marine best practices by eliminating active systems from the design where possible. A FMEA (Failure Modes & Effects Analysis) process has been adopted early in the design to root out potential failure modes and track them. This process along, with RAM (Reliability, Availability and Maintenance), will be used to keep track and generate design goals for Mean Time Between Critical Failure, Mean Down Time and availability or uptime (usually expressed in percentages) at component, subsystem and complete system level.

The inventor believes the LCOE of the invention is a substantial improvement over designs currently deployed, and in the range of offshore wind power (12 to 18 cents/kWh). The LCOE was calculated based on EPRI's Utility Generator economic methodology and assumes no subsidies. The reference location for this deployment is in Humboldt County, Calif., at the PG&E WaveConnect project.

It is clear that for wave energy to become commercially successful and gain a wide market acceptance, it must have a relatively benign environmental footprint. Assessing the potential environmental effects composes an integral part of the development process. For the design according to the invention, particular attention is being paid to issues related to hydraulic fluid spill, impingement, toxicity of anti-fouling paints, and mooring arrangements that could potentially interfere with marine life. The following potential impacts and mitigation measures are shown for illustrative purposes:

| Issues | Mitigation Measures |
|---|---|
| Potential hydraulic fluid leakage | Secondary containment of hydraulic elements, clear operational protocol, use of biodegradable fluids, and vegetable oils. |
| Toxicity of anti-fouling paints | Use of epoxy-based paints with minimal toxicity. |
| Impingement of seals and other larger animals | Design of structure with few gaps between moving parts (i.e. pod-arms and main structure). |
| Entanglement of whales with mooring system and riser cables | Making sure that pretension is at a level that makes entanglement unlikely. i.e. > than a few tons. |
| Operational Spill of hazardous fluids (oil, paint, fuel etc.). | Strict operational procedures and controls to minimize such impacts. Clear response protocol in the event of such spills, and training of personnel. |
| Noise | Incorporate many of the noise mitigating concepts of submarine design and the noise-sensitive wind power industry. |

This is by no means a comprehensive list, but it delineates the critical issues being addressed by design.

Ideally the pods operate and produce energy during all wave conditions. Wave energy extraction is maximized through optimal power take-off control during small waves and will level off at the rated capacity of the generator. As waves become larger and more energetic, excess power is shed by de-tuning the heaving pods. De-tuning is accomplished by applying less than optimal dampening to the pods by means of regulating the hydraulic power take-off in extreme seas. The following table shows the single pod performance as a function of sea-state.

TABLE

Pod electrical output in kW as a function of sea state

| | Tz (s) | | | | | | | | | |
|---|---|---|---|---|---|---|---|---|---|---|
| Hs (m) | 1 | 3 | 5 | 7 | 9 | 11 | 13 | 15 | 17 | 19 | 20 |
| 0.25 | 0 | 0 | 0 | 0 | 0 | 0 | 0 | 0 | 0 | 0 | 0 |
| 0.75 | 0 | 2 | 3 | 3 | 3 | 3 | 3 | 2 | 2 | 2 | 2 |
| 1.25 | 0 | 4 | 8 | 9 | 8 | 7 | 7 | 7 | 7 | 6 | 6 |
| 1.75 | 0 | 9 | 15 | 17 | 16 | 15 | 14 | 13 | 13 | 12 | 12 |
| 2.25 | 0 | 14 | 25 | 28 | 27 | 24 | 23 | 22 | 21 | 20 | 19 |
| 2.75 | 0 | 22 | 38 | 42 | 40 | 36 | 34 | 33 | 32 | 30 | 29 |
| 3.25 | 0 | 30 | 53 | 59 | 56 | 50 | 48 | 46 | 44 | 42 | 40 |
| 3.75 | 0 | 40 | 70 | 79 | 75 | 67 | 64 | 61 | 59 | 56 | 54 |
| 4.25 | 0 | 52 | 80 | 80 | 80 | 80 | 80 | 79 | 76 | 72 | 69 |
| 4.75 | 0 | 65 | 80 | 80 | 80 | 80 | 80 | 80 | 80 | 80 | 80 |
| 5.25 | 0 | 79 | 80 | 80 | 80 | 80 | 80 | 80 | 80 | 80 | 80 |
| 6.25 | 0 | 80 | 80 | 80 | 80 | 80 | 80 | 80 | 80 | 80 | 80 |
| 8.00 | 0 | 80 | 80 | 80 | 80 | 80 | 80 | 80 | 80 | 80 | 80 |

As shown in the above performance matrix, the rated capacity of the generator is limiting the electrical power output per pod to about 80 kW. In Northern California wave conditions, the above performance table would yield an annual average of 32 kW per pod.

While the invention will operate during all of the year, access for O&M servicing may be limited by weather conditions. Operational access to carry out O&M procedures is highly dependent on the ability to access the structure by personnel. In order to do so, the access ramps of the converter according to the invention are sufficiently high above the wave action to allow personnel safe access during normal sea-state operating conditions, which should be the majority of time. Personnel transfer can be done to and from the structure by the service boat or helicopter with methods similar to offshore oil platforms and wind turbines.

Survivability of the design in even the worst storm conditions is critical to the commercial success. The energy converter according to the invention is designed to optimize power production during low power sea-states and will start shedding power approaching extreme conditions. This power shedding is an important and integral aspect of the overall design and is attained by:

Allowing the individual pods to ride-out any extreme event, and minimizing the forces they transfer to the backbone during these conditions.

Having a compliant moored backbone structure that is allowed to flex with extreme waves, but provides a stable point of reference (minimal pitching) during operational conditions. A critical design aspect is that the systems required for survivability are fail-safe and are not active. By embracing this design philosophy, the converter has a much higher chance of surviving the most severe storm.

According to the described embodiment, each Pod generates a maximum of 80 kW. According to a further aspect of the invention a linear generator is used for motion-energy conversion. Wave energy conversion is ideally suited to linear generators whereby the motion of an absorber can be directly coupled. Linear Generators eliminate the need for complex power takeoffs and have the ancillary benefits of improved efficiency and potentially reduced environmental impact. In the are there are theoretical considerations which may serve as a basis for the calculation an design of suitable generators (e.g. work of Oskar Danielsson, Design of a Linear Generator for Wave Energy Plant, University of Uppsala, Master's Degree Project 2003; Wolfbrandt, A., Automated design of a linear generator for wave energy Converters-a simplified model, IEEE Transactions on Magnetics, Volume 42, Issue 7, July 2006 Page(s): 1812-1819)

As explained above, to achieve competitive costs of energy, the system architecture according to the invention does lend itself to economies of scale, while addressing survivability during extreme wave events. The invention is based on novel architecture and integrates the essential criteria that make wave power conversion economically viable. This criteria includes:

Inherent Survivability as the overarching design driver, achieved by allowing the structure to shed any excess loads and therefore reduce the structural mass and design requirements Highly efficient absorption and power conversion processes, measured as the amount of structural material (cost) that is required to achieve a desired electrical output Sufficient carrier or "backbone" length to straddle oncoming waves to provide longitudinal stability, minimizing carrier pitching and thereby extracting maximum wave force by rise and fall of flotation pods Orientation of the Centipod to maximize pod exposure to the wavefront with active yawing to adjust the orientation as needed with wavefront shift in direction.

Scaleability of the architecture as an effective way to reduce LCOE by reducing the percentage of total cost attributable to anchoring and power collection to shore Use of commercially available components for the entire generating system Accessibility of all the system components, and ability to take pods off-line individually for O&M servicing during normal operating sea states Redundancy to reduce the chance of a failure resulting in a catastrophic loss Reduced cost of deployment by simple towing single energy generating devices (e.g. 4.5 MW systems) to the array site and, in most instances, being able to hold station with low-cost gravity anchors.

The invention claimed is:

1. An apparatus for generating power utilizing ocean waves, the apparatus comprising:
   a drive tube;
   a plurality of force transmitting floating pods disposed along a length of the drive tube, wherein the plurality of force transmitting floating pods are responsive to the motion of ocean waves, wherein each of said pods move according to an up-and-down motion of an ocean wave when the drive tube is parallel to an ocean's surface;
   a fluid reservoir;
   a hydraulic turbine;
   a plurality of hydraulic ram pumps, each of the plurality of hydraulic ram pumps driven by a respective pod, whose up and down motion about a pivot drives a piston rod;
   one-way check valves within a hydraulic manifold, such that said one-way check valves open and close to control a flow of fluid;
   wherein said hydraulic manifold forces fluid through a high-pressure line to turn said hydraulic turbine;
   a low-pressure line return path, which returns said fluid to said fluid reservoir; and
   a generator engaged with said hydraulic turbine, such that rotary torque is transmitted to said generator to thereby cause said generator to generate power;
   wherein said hydraulic turbine comprises:
   an impulse turbine; and
   an impulse turbine nozzle, which automatically adjusts a locking force of a pod with changing wave heights.

2. The apparatus of claim 1 wherein said impulse turbine nozzle is connected to said high-pressure line.

3. The apparatus of claim 2 wherein said plurality of hydraulic ram pumps are coupled to an accumulator system feeding the hydraulic turbine and smoothing out oscillations in wave energy.

4. The apparatus of claim 3 wherein the plurality of hydraulic ram pumps are double-acting hydraulic ram pumps thereby providing for energy capture with both upward and downward pod motion driving said hydraulic turbine and generator to generate power.

5. The apparatus of claim 1 comprising means for rotating the pods to a vertical orientation.

6. The apparatus of claim 1 further comprising:
   a backbone base structure having two sections, a first section and a second section;
   said first and second sections being held together by a relief joint wherein pod loadings are transmitted to the backbone sections through pod arms;
   said relief joint includes a releasable mechanical link that enables said backbone to shed loads in extreme sea states essentially decoupling said two sections via a stab arrangement that is set at a predetermined preload that disengages upon excessive bending stresses with a guide wire to bring the overall structure back into alignment.

7. The apparatus of claim 1 wherein said fluid reservoir is a hydraulic reservoir such that fluid is returned to said hydraulic reservoir by said low-pressure line return path.

8. The apparatus of claim 1 wherein said fluid comprises seawater.

9. An apparatus for generating power utilizing ocean waves, the apparatus comprising:
- a drive tube;
- a plurality of force transmitting floating pods disposed along a length of the drive tube, wherein the plurality of force transmitting floating pods are responsive to the motion of ocean waves, wherein each of said pods move according to an up-and-down motion of an ocean wave when the drive tube is parallel to an ocean's surface;
- a fluid reservoir;
- a hydraulic turbine;
- a plurality of hydraulic ram pumps, each of the plurality of hydraulic ram pumps driven by a respective pod, whose up and down motion about a pivot drives a piston rod;
- one-way check valves within a hydraulic manifold, such that said one-way check valves open and close to control a flow of fluid;
- wherein said hydraulic manifold forces fluid through a high-pressure line to turn said hydraulic turbine;
- a low-pressure line return path, which returns said fluid to said fluid reservoir;
- a generator engaged with said hydraulic turbine, such that rotary torque is transmitted to said generator to thereby cause said generator to generate power; and
- two flooding chambers in a pod, one for operational ballast with a small water inlet that is always open and an air exit outlet; and one with an air pump, air hose line and water exit holes to evacuate the water in said flooding chamber by air displacement.

10. The apparatus of claim 9 wherein a sealed buoyancy chamber is provided in said pod, which remains sealed with air to provide for minimal buoyancy in a case of submergence when said flooding chamber is allowed to flood.

11. An apparatus for generating power utilizing ocean waves, the apparatus comprising:
- a plurality of force transmitting floating pods responsive to the motion of ocean waves, wherein each of said pods move according to an up-and-down motion of an ocean wave;
- a fluid reservoir;
- a hydraulic turbine;
- a plurality of hydraulic ram pumps, each of the plurality of hydraulic ram pumps driven by a respective pod, whose up and down motion about a pivot drives a piston rod;
- one-way check valves within a hydraulic manifold, such that said one-way check valves open and close to control a flow of fluid;
- wherein said hydraulic manifold forces fluid through a high-pressure line to turn said hydraulic turbine;
- a low-pressure line return path, which returns said fluid to said fluid reservoir; and
- a generator engaged with said hydraulic turbine, such that rotary torque is transmitted to said generator to thereby cause said generator to generate power;
- a backbone base structure having two sections, a first section and a second section;
- said first and second sections being held together by a relief joint wherein pod loadings are transmitted to the backbone sections through pod arms;
- said relief joint includes a releasable mechanical link that enables said backbone to shed loads in extreme sea states essentially decoupling said two sections via a stab arrangement that is set at a predetermined preload that disengages upon excessive bending stresses with a guide wire to bring the overall structure back into alignment;
- said backbone base structure has a square framing system having four stab-on elements at each corner of the square with smaller diameter tubular braces at each face of the unit providing the framing system along the length of the backbone as well as each panel level where the pod loadings are transmitted to the backbone through said pod arms;
- one end of the backbone first section being stabbed into a guide in said backbone second section;
- each of the four stab-on elements providing for locking in of each of the four legs to provide continuity of the system, such that the backbone functions as a single unit made up of said two sections;
- whereby upon a condition that axial loads exceed the lock-in capacity, the stab-on legs are released but retained within said guides.

12. A method of obtaining optimum energy extraction from a wave energy converter buoy system comprising steps of:
(1) holding the buoy at a fixed height until the waterline rises to a depth of ¼ of the wave height above neutral;
(2) allowing the buoy to rise to the crest of the wave at a constant buoyancy force generated by the increasing water height, wherein the resulting buoy stroke is equal to ½ of the wave height;
(3) upon a condition that the buoy reaches the crest of the wave, holding the buoy at that height until the water line falls to an amount of ¼ wave height below neutral; and
(4) allowing the buoy to fall to the trough of the wave at a constant force generated by the decreased water height, whereby the resulting buoy stroke is equal to ½ of the wave height.

13. An apparatus for generating power utilizing ocean waves comprising:
- a rotary shaft;
- a plurality of force transmitting floating pods responsive to the motion of ocean waves wherein each of said pods is coupled to one of a multiple of lever assemblies, each lever assembly transmitting the motion of the pods to said rotary shaft engaged with said lever assembly, the pods with the lever assembly being arranged along the rotary shaft in an axially direction thereof, wherein said rotary shaft produces a rotary torque when said pods move according to an up-and-down motion of an ocean wave,
- said lever assemblies being coupled to said rotary shaft via a device that allows a transmission of a rotary motion from a lever assembly to said shaft in only one direction, while preventing transmission of rotary motion in the opposite direction;
- a backbone base structure having two sections, a first section and a second section;
- said first and second sections being held together by a relief joint wherein pod loadings are transmitted to the backbone sections through pod arms;
- said relief joint includes a releasable mechanical link that enables said backbone to shed loads in extreme sea states essentially decoupling said two sections via a stab arrangement that is set at a predetermined preload that disengages upon excessive bending stresses with a guide wire to bring the overall structure back into alignment;

said backbone base structure has a square framing system having four stab-on elements at each corner of the square with smaller diameter tubular braces at each face of the unit providing the framing system along the length of the backbone as well as each panel level where the pod loadings are transmitted to the backbone through said pod arms;

one end of the backbone first section being stabbed into a guide in said backbone second section;

each of the four stab-on elements providing for locking in of each of the four legs to provide continuity of the system, such that the backbone functions as a single unit made up of said two sections;

whereby upon a condition that axial loads exceed the lock-in capacity, the stab-on legs are released but retained within said guides.

* * * * *